(12) United States Patent
Nishida et al.

(10) Patent No.: US 7,624,676 B2
(45) Date of Patent: Dec. 1, 2009

(54) METHOD OF PREPARING FRY COOKED PRODUCT AND FRY COOKING DEVICE

(75) Inventors: Minoru Nishida, Kanagawa (JP); Akira Okumura, Kanagawa (JP); Toshiyuki Inui, Kanagawa (JP)

(73) Assignee: Nisshin Oillo Group, Ltd., Tokyo (JP)

( * ) Notice: Subject to any disclaimer, the term of this patent is extended or adjusted under 35 U.S.C. 154(b) by 535 days.

(21) Appl. No.: 10/724,084

(22) Filed: Dec. 1, 2003

(65) Prior Publication Data

US 2004/0107957 A1  Jun. 10, 2004

Related U.S. Application Data

(63) Continuation of application No. PCT/JP02/05279, filed on May 30, 2002.

(30) Foreign Application Priority Data

May 31, 2001 (JP) .............................. 2001-165762
Nov. 19, 2001 (WO) ....................... PCT/JP01/10089

(51) Int. Cl.
A47J 37/12 (2006.01)
(52) U.S. Cl. ............................... 99/403; 99/413; 99/422
(58) Field of Classification Search ........... 99/403–418, 99/330, 331, 426, 444–450, 422–425, 336, 99/337; 126/390.1, 299 R, 373.1, 376.1; 219/422–425, 429–433, 437–439, 386
See application file for complete search history.

(56) References Cited

U.S. PATENT DOCUMENTS

| | | | | |
|---|---|---|---|---|
| 2,635,528 A | * | 4/1953 | Torres | 99/413 |
| 3,613,553 A | * | 10/1971 | Popeil | 99/426 |
| 3,985,071 A | * | 10/1976 | Pottinger et al. | 99/403 |
| 4,287,818 A | | 9/1981 | Moore | |
| 4,542,684 A | * | 9/1985 | Cantrell | 99/403 |
| 4,542,685 A | * | 9/1985 | Wilson | 99/413 |
| 4,704,290 A | * | 11/1987 | Fritzsche | 426/438 |
| 4,854,227 A | | 8/1989 | Koopman | |
| 4,922,435 A | | 5/1990 | Cahlander | |
| 4,930,408 A | | 6/1990 | King | |
| 4,941,400 A | | 7/1990 | Moore | |
| 5,184,539 A | * | 2/1993 | Oiwa | 99/408 |
| 5,836,238 A | | 11/1998 | Kobayashi | |

FOREIGN PATENT DOCUMENTS

| | | |
|---|---|---|
| JP | 55-91325 | 7/1980 |
| JP | 62-220160 A | 9/1987 |
| JP | 1-17223 Y2 | 5/1989 |
| JP | 1-164337 A | 6/1989 |
| JP | 1-310617 A | 12/1989 |
| JP | 2-172423 A | 7/1990 |
| JP | 3-207926 A | 9/1991 |
| JP | 5-115385 A | 5/1993 |
| JP | 10-52374 A | 2/1998 |
| JP | 2000-271018 | 10/2000 |
| WO | WO 02/098266 A1 * | 12/2002 |

* cited by examiner

Primary Examiner—Timothy F. Simone
(74) Attorney, Agent, or Firm—Bacon & Thomas, PLLC

(57) ABSTRACT

Frying ingredients are fry-cooked within a frying oil layer used for fry cooking, under the conditions meeting a relationship of $HA/SA^{1/2}=0.6$ to $3.5$, where SA denotes the surface area of the frying oil layer and HA denotes the height from the bottom to the surface of the frying oil layer.

8 Claims, 15 Drawing Sheets

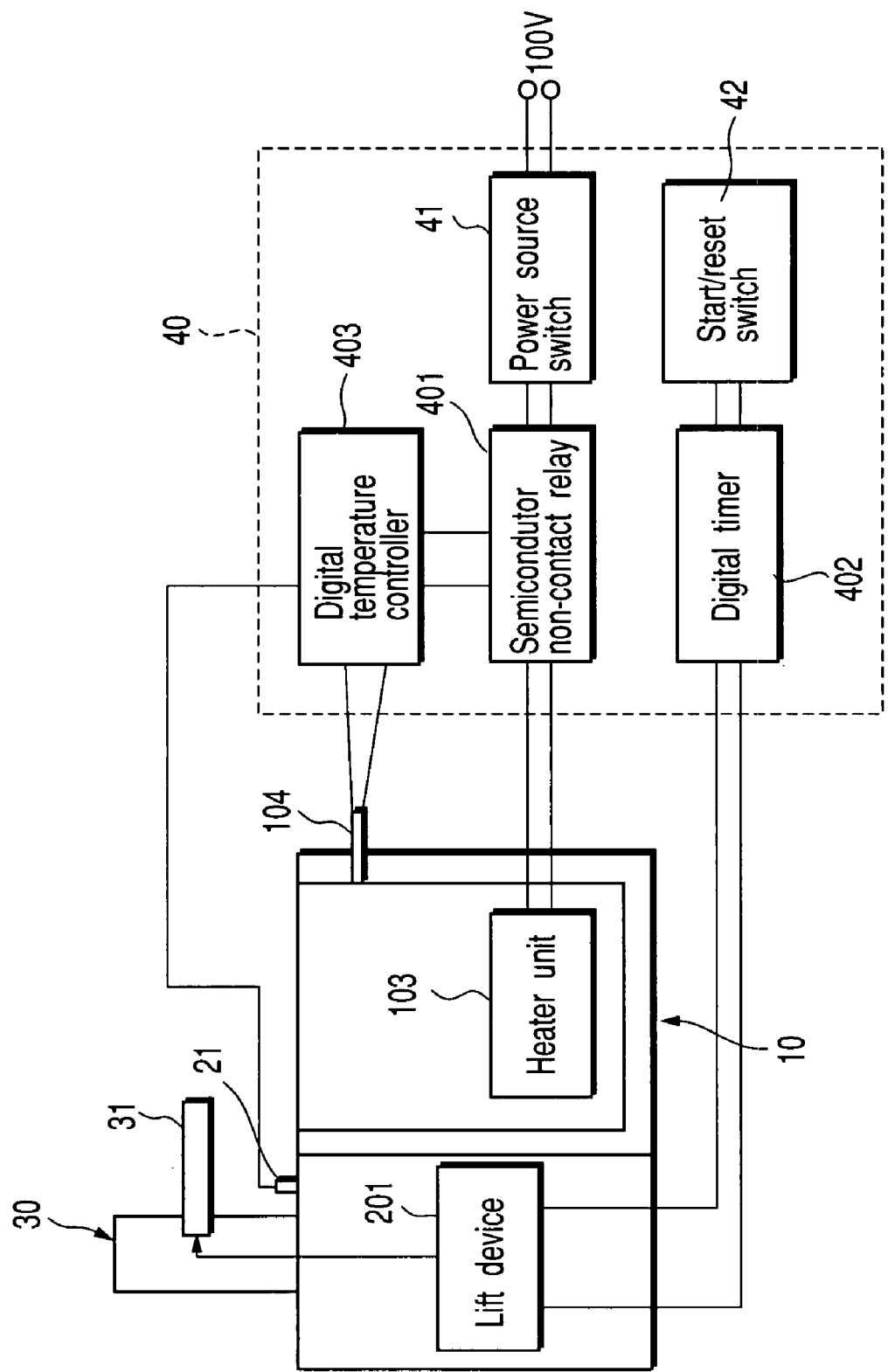
F I G. 3

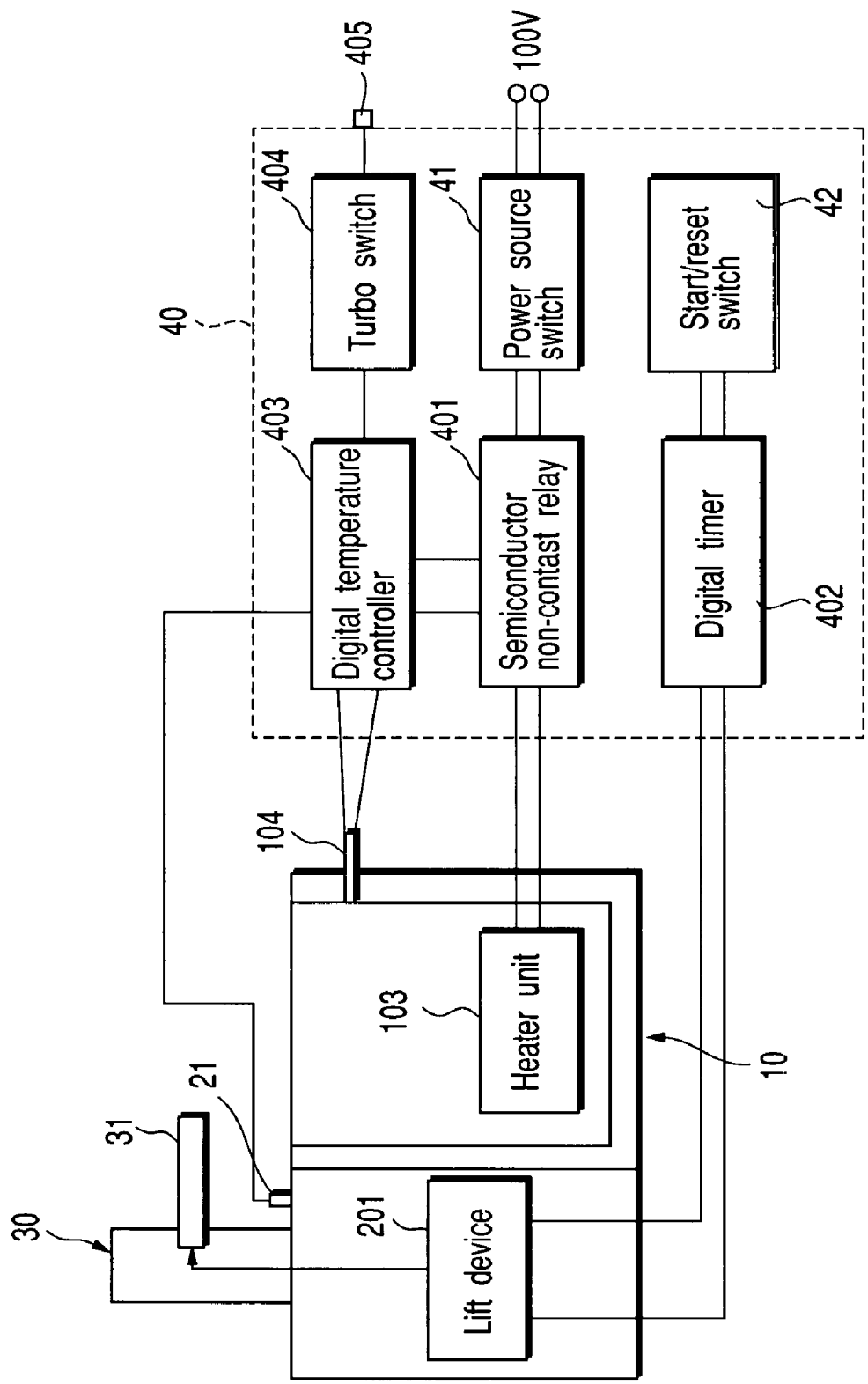
F I G. 8

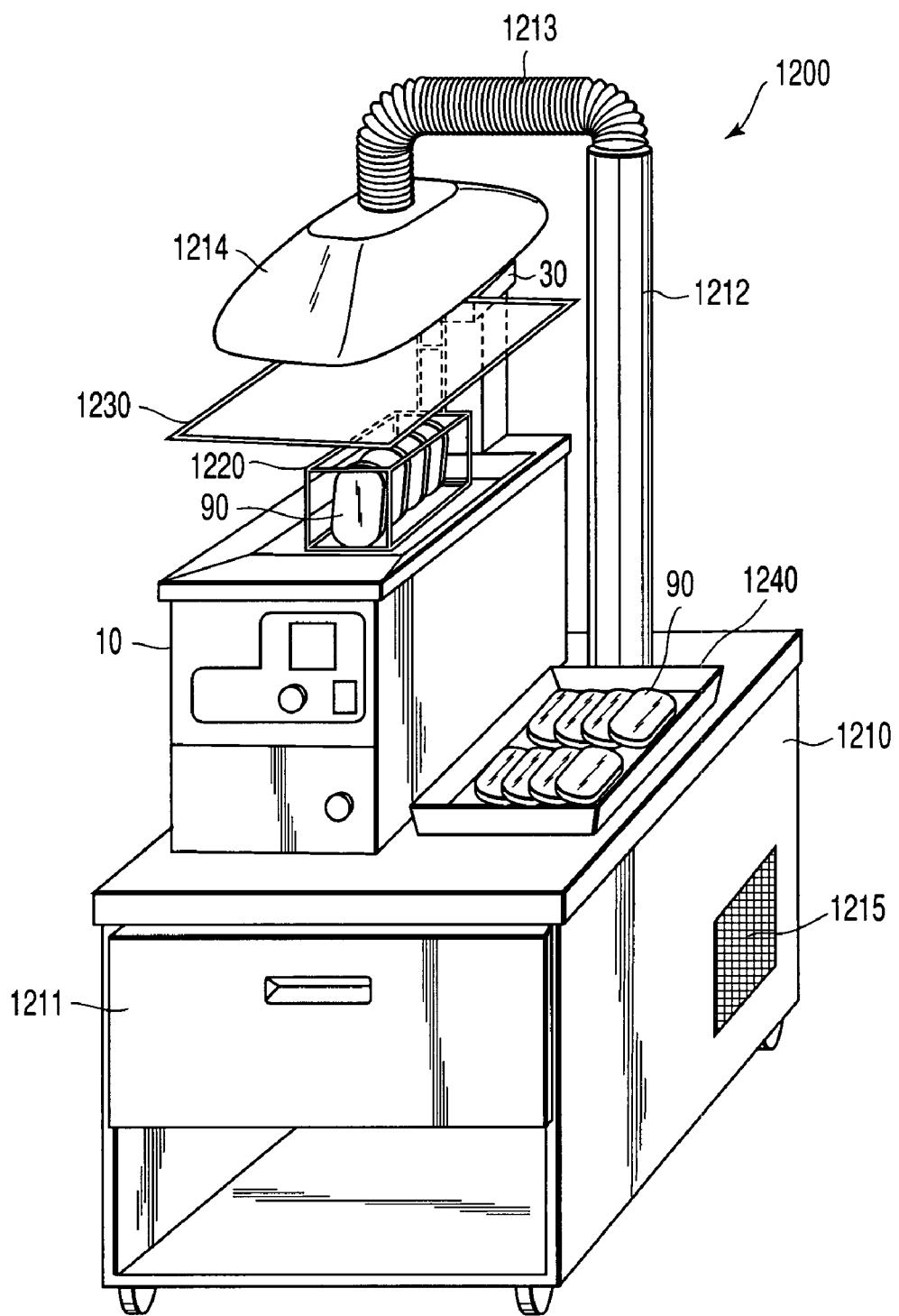
F I G. 12

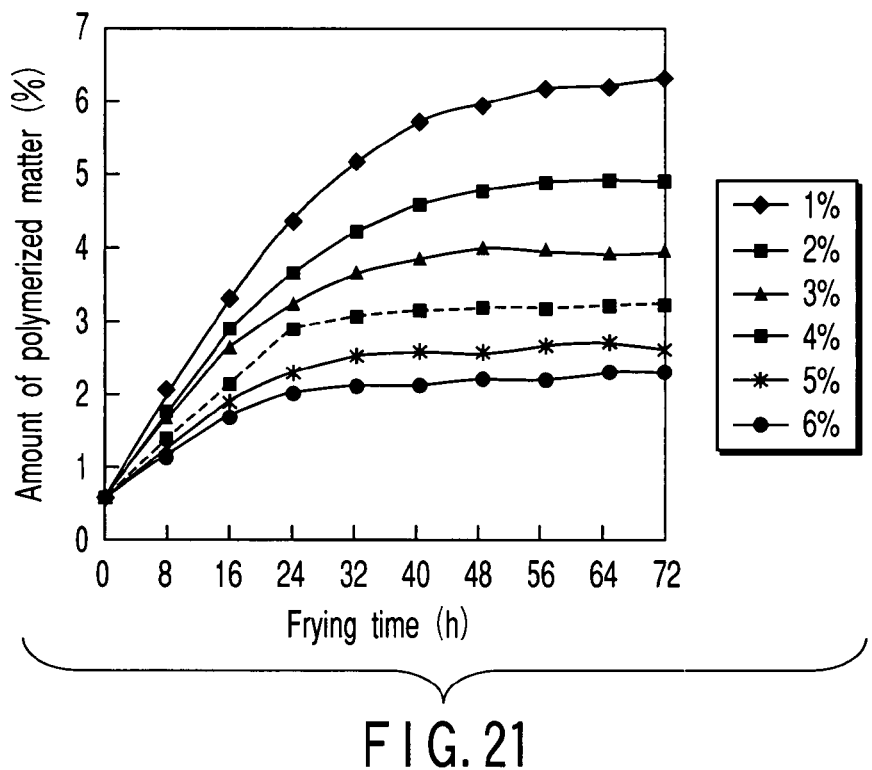
F I G. 21
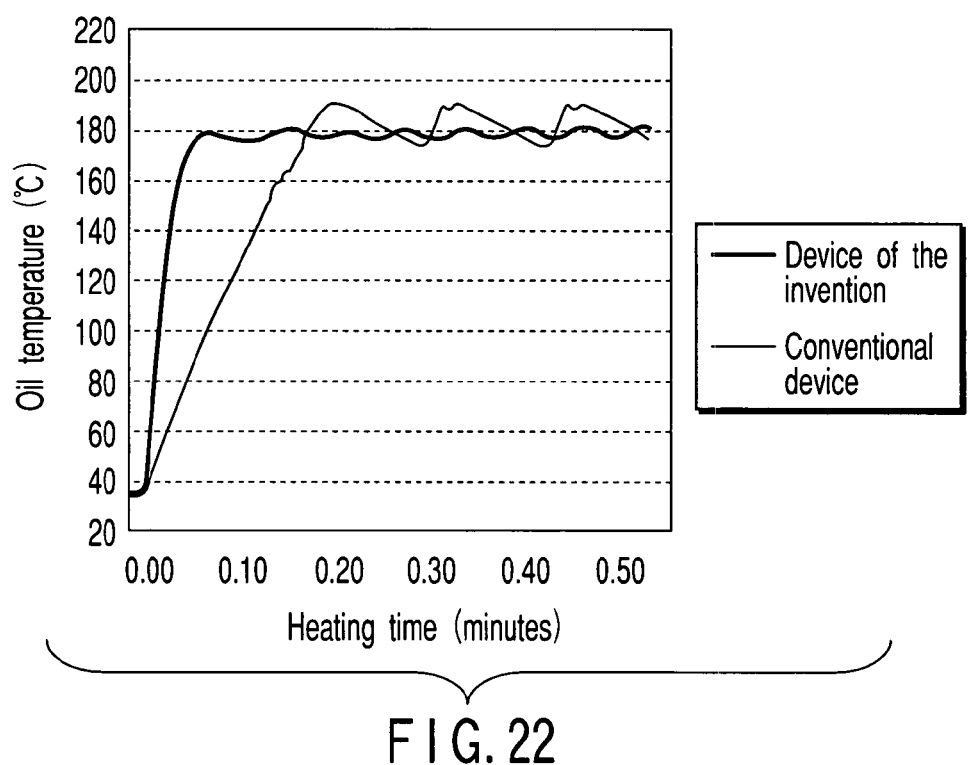
F I G. 22

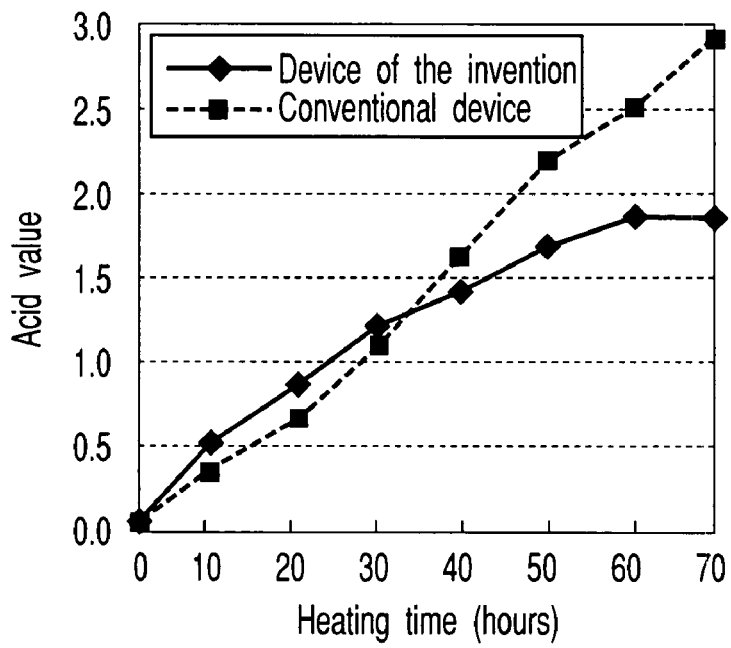
F I G. 25
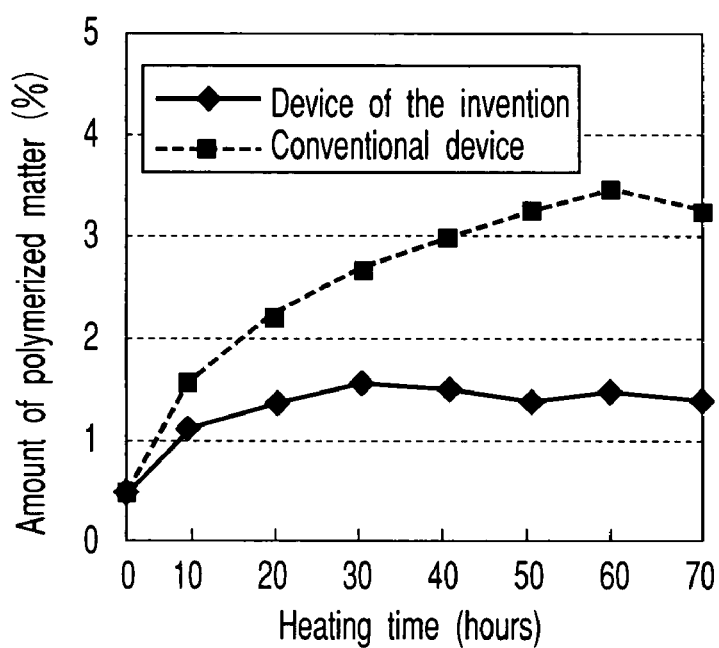
F I G. 26

METHOD OF PREPARING FRY COOKED PRODUCT AND FRY COOKING DEVICE

CROSS-REFERENCE TO RELATED APPLICATIONS

This is a Continuation Application of PCT Application No. PCT/JP02/05279, filed May 30, 2002, which was not published under PCT Article 21(2) in English.

This application is based upon and claims the benefit of priority from the prior Japanese Patent Application No. 2001-165762, filed May 31, 2001 and the prior PCT Application No. PCT/JP01/10089, filed Nov. 19, 2001, the entire contents of both of which are incorporated herein by reference.

BACKGROUND OF THE INVENTION

1. Field of the Invention

The present invention relates to a method of preparing a fry cooked product and fry cooking device.

2. Description of the Related Art

In fry cooking, it is important to make appropriate the quality of the fry cooked product and to supervise the quality of the fat/oil used for fry cooking.

Edible oil is subjected to chemical change such as decomposition and polymerization during fry cooking under the influences of the oxygen in the air, the heat generated from the heater, and water generated from the frying ingredients so as to give rise to deteriorated materials of the fat/oil such as free fatty acids, carbonyl compounds and polymerized matters. These deteriorated materials of the fat/oil are accumulated in the frying oil with process of the fry cooking time. Further, together with, for example, the frying refuse separated from the frying ingredients and the animal fat eluted from the frying ingredients, the deteriorated materials cause increases in the coloring, the viscosity, fuming and foaming of the frying oil. In addition, the frying oil is caused to generate an unpleasant odor and an unpleasant taste. The fry cooked product prepared by using such frying oil is rendered poor in flavor and presents an oily outer appearance so as to markedly lower the commercial value of the fry cooked product. Such being the situation, it is necessary to use all the time the frying oil having a low degree of deterioration.

In the conventional fry cooking apparatus (fryer), it is unavoidable for the frying oil to be deteriorated and for the deteriorated materials of the fat/oil to be accumulated. Under the circumstances, it was necessary in the past to discard entirely or partly the frying oil at the time when the degree of deterioration was increased to some extent and, then, to substitute a fresh frying oil. The discarding operation of the deteriorated frying oil is laborious. In addition, it is dangerous to discard the frying oil under the state of a high temperature because, for example, the operator is possibly scalded. What should also be considered is the disposal of the waste frying oil. In many cases, the disposal of the waste frying oil is consigned to the traders handling the waste oil. In recent years, the consignment fee is required and the consignment fee constitutes a big burden to the traders handling the fried food. Also, the requirement for the traders handling the fried food to suppress the generation of the waste frying oil is increased in view of the reduction of the industrial waste, too.

The method for decreasing the generation of the waste frying oil can be roughly classified into a method for suppressing the deterioration of the frying oil during the frying operation and a method for cleaning the deteriorated frying oil used for fry cooking. For suppressing the deterioration of the frying oil during the fry cooking, it is proposed to dip in the frying oil a porous material such as a ceramic material or calcined and powdered bones (Japanese Patent Disclosure (Kokai) No. 09-142950 and Japanese Patent Disclosure No. 62-101699). It is also proposed to apply voltage or current to the frying oil during the fry cooking (Japanese Patent Disclosure No. 09-100489 and Japanese Patent Disclosure No. 10-276744). However, with these methods, it is difficult to suppress effectively the deterioration of the frying, a high cost is required for introducing the apparatus and the running cost is high.

On the other hand, the method for cleaning the deteriorated frying oil has already been put to the practical use by, for example, utilizing the absorbing and filtering function performed by a porous body such as an activated charcoal or activated clay or by a filtering paper sheet of very fine meshes. This method produces a certain effect in respect of the removal of the fine fry refuse or the recovery of the color of the frying oil. However, the effect produced by this technology is much limited in respect of the removal of the fat/oil polymerized matters and the decomposed materials of the fat/oil generated in a large amount in the deteriorated frying oil (Japanese Patent Disclosure No. 6-166820 and Japanese Patent Disclosure No. 2000-178578).

Particularly, Japanese Patent Disclosure No. 62-220160 discloses, as a method of suppressing the deterioration of the frying oil, a cooking method in which the turnover rate of the frying oil, i.e., the frying amount per unit time (kg/hour) relative to the amount (liters) of the frying oil used, is set at 100%/hour or more, and a ratio of the contact area ($cm^2$) of the frying oil with the air relative to the amount (liters) of the frying oil used, is set at 140 or less. However, it is well known in the art that the increase in the turnover rate of the frying oil and the decrease of the contact area of the frying oil with the air are effective for preventing the frying oil from being deteriorated. Also, it is certainly possible to increase the turnover rate of the frying oil to 100% or more in a large continuous fryer used in a food factory in which a large amount of frying ingredients are being fried continuously over a long time. However, it is substantially impossible to increase the turnover rate of the frying oil to 100% or more in a middle or small fryer used in a daily household dish store or a supermarket. Also, a ratio of the contact area ($cm^2$) of the frying oil with the air to the amount (liters) of the frying oil used is not larger than 140 in almost all the cases in the middle and small fryers. It should be noted that the ratio noted above corresponds to a reciprocal number (1/H) of the depth (H) of the oil layer. It should also be noted that the prior art quoted above refers to all the fryers having the depth H of about 7.2 cm or more. In short, all the fryers fall within the range referred to in this prior art. It follows that this prior art does not suggest at all the technology for overcoming the problem in respect of the deterioration of the frying oil based on, for example, the shape of the oil layer.

Thus, an object of the present invention is to provide a method of preparing a fry cooked product, which permits maintaining the quality of the fat/oil by suppressing the elevation in the concentration of the deteriorated material in the fat/oil used for fry cooking, and which also permits maintaining appropriately the quality of the fry cooked product. Another object of the present invention is to provide a fry cooking device that permits the cooking method employed in the present invention to be worked suitably.

BRIEF SUMMARY OF THE INVENTION

According to the present invention, to achieve the above-noted object, there is provided a method of preparing a fry cooked product, characterized in that frying ingredients are fry cooked in a frying oil layer under the conditions meeting the relationship of $HA/SA^{1/2}=0.6$ to 3.5, where SA represents the area of the oil surface of the frying oil layer, and HA denotes the height from the bottom to the surface of the frying oil layer.

According to another aspect of the present invention, there is provided a fry cooking device characterized by comprising a frying oil vessel meeting the relationship of $HB/SB^{1/2}=0.8$ to 4.0, where SB denotes the area of the open portion corresponding to the oil surface, and HB denotes the depth from the open portion to the bottom.

BRIEF DESCRIPTION OF THE SEVERAL VIEWS OF THE DRAWING

FIG. 3 is a block diagram showing the construction of the circuit of the control box equipped with an oil supply mechanism;

FIG. 8 is a block diagram showing the construction of the circuit of the control box equipped with an oil supply mechanism according to one embodiment of the present invention;

FIG. 12 is an oblique view schematically exemplifying the construction of a fry cooking device of the present invention equipped with a local exhaust device;

FIG. 21 is a graph showing the change with time in the degree of deterioration (polymerized matter amount) for each turnover rate (1% to 6%) in Example 3;

FIG. 22 is a graph showing the relationship between the temperature of the frying oil and the heating time when the frying oil was heated in Example 8;

FIG. 25 is a graph showing the relationship between the acid value of the frying oil after the fry cooking and the heating time in the case of using the fry cooking device of the present invention and the conventional fry cooking device in Example 17; and FIG. 26 is a graph showing the relationship between the amount of the polymerized matter contained in the frying oil after the fry cooking operation and the heating time in the case of using the fry cooking device of the present invention and the conventional fry cooking device in Example 17.

DETAILED DESCRIPTION OF THE INVENTION

Figure 1:
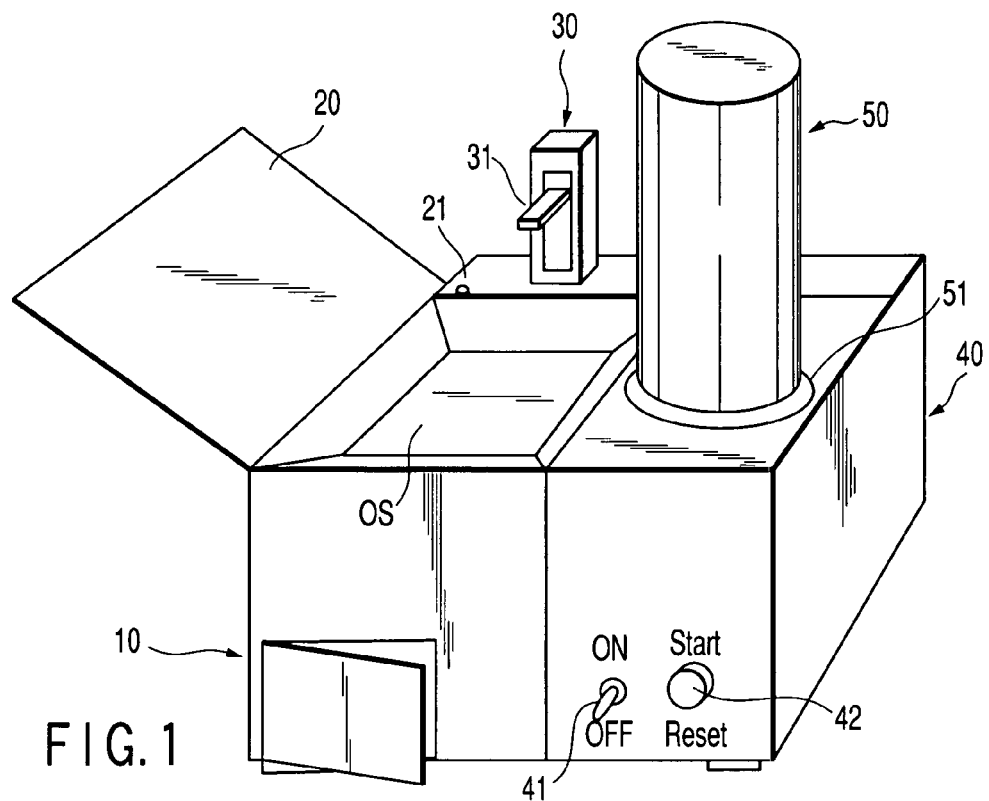
FIG. 1 is an oblique view exemplifying the construction of a fryer apparatus according to one embodiment of the present invention.

The present invention will now be described in detail. Where the accompanying drawings are referred to in the following description, the same or similar elements are denoted by the same reference numerals throughout all the drawings.

As already described, the present invention defines that the fry cooking is carried out in the present invention under the condition meeting the relationship $HA/SA^{1/2}=0.6$ to 3.5, where SA denotes the area of the oil surface of the frying oil layer, and HA denotes the height between the bottom and the surface of the frying oil layer.

As described previously, it is necessary to supervise the quality of the fry cooked product and the quality of the frying oil in the fry cooking.

Concerning the quality of the frying oil, the surface area of the frying oil and the volume (or weight) of the frying oil are said to constitute important factors determining the degree of deterioration of the frying oil. To be more specific, the rate of deterioration of the frying oil is known to be proportional to S/V, where S denotes the surface area of the frying oil, and V denotes the volume of the frying oil. It should be noted that, where the height of the frying oil layer between the bottom and the surface of the frying oil layer is denoted by H, $V = S \times H$. It follows that the deterioration rate of the frying oil is proportional to 1/H. In other words, the deterioration rate, i.e., the tendency to deterioration, is determined by the distance H between the bottom and the surface of the frying oil layer, and the surface area S and the volume V themselves are not directly relevant to the deterioration rate. This implies that, where the height H is the same, there is no difference in the tendency to deterioration regardless of the surface area S of the oil surface. In other words, where the height H is the same, there is no difference in the tendency to deterioration of the frying oil, even if the frying oil forms a cubic oil layer having a vertically long rectangular cross section or forms a cubic oil layer having a horizontally long rectangular cross section.

In order to maintain the quality of the frying oil at a level not lower than a prescribed level during the frying operation, it is considered important to suppress the deterioration of the frying oil. However, the produced effect is limited in the case of simply suppressing the deterioration of the frying oil, with the result that the frying oil is deteriorated to reach the limit of use in a relatively short time. In this case, it is necessary to discard all the fat/oil of the frying oil layer and to use a new frying oil. Naturally, a large amount of new frying oil is required. In addition, it is necessary to dispose of the discarded waste frying oil. It follows that detrimental effects are generated in terms of the cost and the environmental problem. The disposal of the waste frying oil, which is costly and laborious, constitutes a serious problem. Also, the amount of the waste frying oil and the amount of required new frying oil are increased with increase in the volume of the frying oil layer, leading to an increase in the cost.

Under the circumstances, the present inventors have conducted an extensive research on the quality of the frying oil used for fry cooking and found that the quality of the frying oil during the fry cooking is greatly affected by not only the tendency to deterioration of the frying oil used but also, for example, the amount of new oil added to the frying oil for replenishing the frying oil absorbed by the fry ingredients during the actual frying operation. The present invention has been accomplished based on the finding pointed out above.

To be more specific, the present inventors have paid attention to the aspect of suppressing the amount of the deteriorated material present in the frying oil to a prescribed amount or less as a view point of evaluating and supervising the quality of the frying oil during the frying operation. The desired object can be achieved by paying attentions to the aspect of increasing the turnover rate, i.e., the addition amount of new oil relative to the amount of the fat/oil present in the frying oil layer, in addition to the aspect of suppressing the deterioration of the frying oil as a method of suppressing the amount of the deteriorated material to a prescribed level or low. The turnover rate is obtained by formula (1) given below:

Turnover rate (%/hour)=(Oil supply amount per unit time (g/hour)÷Amount of the fat/oil in the frying oil layer (g))×100 (%)     (1)

As a result of the detailed observation and study of the actual frying operation, it has been found in the present invention that it is desirable to deal with the supervision of the quality of the frying oil by both suppressing the deterioration of the frying oil and increasing the turnover rate. The desired object is achieved in the present invention based on the technical idea described in the following, not by the simple idea of increasing the amount of the oil absorption.

To be more specific, as described previously, V=S×H. In order to suppress the degree of deterioration of the frying oil, it is desirable to diminish the surface area S of the frying oil layer at which the frying oil is brought into contact with oxygen (it is preferable that the volume V is large). On the other hand, it is desirable to diminish the volume V in order to increase the turnover rate. At this stage, the height H is not particularly limited, and it suffices for the height to have a practical value.

The volume V is automatically limited by the amount of the frying ingredients used. In order to increase the turnover rate, it is desirable for the volume V to be as small as possible as described below in detail.

Where the volume defined as above is assumed to be a fixed value $V_0$, it is inevitably desirable for the height H to be large because it is desirable for the surface area S to be small as described above.

It should be noted that the values of the surface area S and the height H are limited to fall within certain ranges in view of the practical situation. It has been found in the present invention that the capability of retaining a suitable quality of the frying oil and the frying operability are satisfied in the case where the surface area S and the height H have a prescribed relationship.

More specifically, the present invention is directed to a method of preparing a fry cooked product, characterized in that the frying ingredients are subjected to a fry cooking under the condition that the value of the relationship between the surface area SA of the frying oil layer and the height HA between the bottom and the surface of the frying oil layer, which is defined by $HA/SA^{1/2}$, falls within a range of 0.6 to 3.5, preferably 0.65 to 3.0, more preferably 0.7 to 2.75, particularly desirably 0.75 to 2.5, more particularly desirably 0.8 to 2.25, and most desirably 0.9 to 2.0. As pointed out above, in the present invention, it is desirable for the surface area SA to be small and for the height HA to be large. In other words, it is desirable for the value of $HA/SA^{1/2}$ to be large. However, in view of the actual frying operation, where the surface area SA of the frying oil layer is excessively small, the frying operability is impaired, and where the height HA is excessively large, the convection of the frying oil is impaired so as to render the frying operation nonuniform. On the other hand, where the relationship between the surface area SA and the height HA falls within the range specified in the present invention, it is possible to suppress the deterioration of the frying oil and to achieve a high turnover rate while avoiding the detrimental effects pointed out above, with the result that it is possible to suppress the amount of the deteriorated material present in the frying oil to a prescribed amount or less.

Incidentally, where the fry cooking is performed by using the conventional fry cooking device, it is common practice that the value of $HA/SA^{1/2}$ falls within a range of about 0.1 to 0.4.

Where the fry cooking is performed under the conditions specified in the present invention, the frying oil layer is considered to form a cubic body or a columnar body relatively longer in the vertical direction. In the present invention, the surface area of the frying oil layer is small relative to the volume of the frying oil as described above. It follows that the area of the frying oil in contact with the air is small so as to suppress the deterioration of the frying oil during the fry cooking. It should be noted in this connection that it is not necessarily satisfactory to decrease the surface area. If the frying oil layer is excessively long in the vertical direction, various inconveniences are brought about so as to make the frying oil layer unsuitable for fry cooking as described previously. To be more specific, if the frying oil layer is excessively long in the vertical direction, it is difficult to perform the frying operation. Also, since the convection is not carried out in the heated frying oil, the frying oil is partly heated excessively so as to promote the deterioration of the frying oil. Also, since a temperature gradient is formed in the frying oil layer, the fry cooking is rendered nonuniform.

Such being the situation, where an actual frying operation is assumed, it is desirable for the distance (average value) between the surface and the bottom of the frying oil layer to fall generally within a range of 10 cm to 200 cm, preferably 10 cm to 100 cm, and most preferably 10 cm to 40 cm. Also, it is desirable for the surface area SA to fall generally within a range of 30 cm² to 30,000 cm², preferably 30 cm² to 3,000 cm², and more preferably 30 cm² to 1,000 cm². In practice, inconveniences are brought about if the distance H between the surface and the bottom of the frying oil layer is excessively short or if the surface area SA is excessively small. For example, it is difficult to carry out the frying operation in such a case. By contraries, it is undesirable for the distance H to be excessively long or for the surface area SA to be excessively large because the frying oil layer actually used is rendered excessively large in such a case, which does not meet the practical situation. In the present invention, it is possible for the frying zone of the frying oil layer (the region within the frying oil layer in which the ingredients are actually subjected to the fry cooking) to cover at least 50%, preferably at least 60%, more preferably at least 70%, and most preferably at least 80% of the distance between the surface and the bottom of the frying oil layer.

Also, in order to increase the turnover rate, the relationship between the amount of the oil absorption and the amount of the frying oil is important, as apparent from formula (1) given above. The amount of the frying oil (amount of the oil constituting the frying oil layer) should desirably be as small as possible. In other words, the fixed value $V_0$ should desirably be as small as possible. This implies that it is desirable for a prescribed amount of the frying ingredients to be cooked with a small amount of the frying oil. In other words, the loading rate of the frying ingredients should desirably be as high as possible.

Accordingly, in the present invention, the fry cooking is carried out under the above-mentioned conditions, with the loading rate represented by a percentage of the sum of the total volume of the frying ingredients loaded in the frying oil layer during fry cooking plus the total volume of the frying oil layer with respect to the total volume of the frying ingredients (the total volume of the frying ingredients/(the total volume of the frying ingredients+the volume of the frying oil layer)× 100) being set at 12% or more, preferably 15% or more, and more preferably 16% or more. It is undesirable for the loading rate of the frying ingredients to be lower than the range noted above because the turnover rate is not improved in this case. Also, if the loading rate of the frying ingredients is excessively high, the amount of the frying ingredients is excessively large, resulting in failure to achieve an appropriate fry cooking. Incidentally, the loading rate in the conventional fry cooking is 4 to 8%.

A high loading rate of the frying ingredients indicates that the same amount of the frying ingredients are cooked in a smaller amount of the frying oil. In the present invention, it is possible to set the amount (volume) of the frying oil relative to the amount (volume) of the frying ingredients at 7.4 (V/V) or less, preferably at 6.2 (V/V) or less, and more preferably at 5.3 (V/V) or less. According to the present invention, it is possible to decrease the volume ratio of the oil/ingredients to 2.

In the case of using frying ingredients having, particularly, a flat configuration in the present invention, the loading rate of the frying ingredients can be increased and the fry cooking can be carried out under the above-mentioned conditions by setting the angle made between the flat surface of the frying ingredients and the surface of the frying oil at 45° to 135°, preferably 60° to 120°, more preferably 70° to 110°, and most preferably 75° to 105°. Particularly, the fry cooking can be performed satisfactorily, if the fry cooking is performed by loading the flat frying ingredients on a carrier such that the flat surface of the frying ingredients make such an angle with the oil surface. In the conventional fry cooking, the frying ingredients are disposed parallel to the frying oil surface or are allowed to float on the frying oil surface. Such being the situation, the angle corresponding to that given above, which is made between the frying ingredients and the frying oil surface, is maintained at about 180°.

Further, the loading rate noted above can be increased by allowing the entire frying ingredients to be disposed at a position lower than the frying oil surface (immersing the entire frying ingredients in the frying oil layer). As a result, the turnover rate can be increased as described above so as to maintain the quality of the frying oil at an appropriate level. Further, it is possible to obtain appropriate effects in respect of the working environment for fry cooking and the fry cooked product, as described below.

To be more specific, the frying ingredients can be cooked in an amount of the frying oil smaller than that in the conventional case by increasing the loading rate of the frying ingredients. In this case, the volume of the frying oil layer can be diminished so as to obtain a merit on the aspect of the working that the equipment can be made compact, a merit on the aspect of the cooking cost that the amount of the frying oil used can be decreased, and a merit on the aspect of the environmental problem that waste oil that is generated can be decreased.

The amount of the frying oil used for fry cooking is greatly affected by the amount of replenishing frying oil and the amount of the waste frying oil in addition to the size of the frying oil layer. In the method and the fry cooking device of the present invention, it is possible to decrease markedly the amount of the frying oil used because the same amount of the frying ingredients can be cooked with a small amount of the frying oil, i.e., the volume of the frying oil layer is small; since the amount of the frying oil absorbed by the frying ingredients is small, the amount of the replenishing frying oil can be decreased; since the deteriorated materials contained in the frying oil can be maintained at a level lower than a prescribed level, it is possible to retard the timing at which the waste frying oil is generated; and it is substantially possible to prevent the generation of the waste frying oil. It should be noted that the factor giving the largest influence to the amount of use of the frying oil is the waste frying oil. To be more specific, where the frying oil used is discarded as a waste frying oil, it is necessary to use a new frying oil in an amount corresponding to the amount of the waste frying oil, with the result that the amount of the frying oil used is markedly increased. According to the present invention, it is possible to decrease, for example, significantly the amount of use of the frying oil, compared with the prior art, even in the case of the use of the frying oil in such a short period as not to generate the waste frying oil. In the standard fry cooking conditions in the prior art, the ratio of $HA/SA^{1/2}$ can be set at about 0.3, and the loading rate of the frying ingredients can be set at about 6%. These conditions are called the standard conventional conditions. Also, the fry cooking method under the standard conventional conditions is called the standard conventional method. According to the present invention, the amount of use of the frying oil can be lowered to a level not higher than 70% of the standard conventional method. Further, where a waste frying oil is generated, the amount of use of the frying oil in the present invention can be lowered to a level not higher than 65%, preferably not higher than 60%, more preferably not higher than 55%, and particularly preferably not higher than 50%, of the standard conventional method. The amount of use of the frying oil can be lowered in the present invention to 10% of that of the standard conventional method. Also, the amount of use of the frying oil can be further lowered by carrying out the frying operation under the conditions which permit preventing the generation of the waste frying oil over a long period of time. Attentions should be paid to, particularly, Example 10 described herein later. Where, for example, the waste frying oil is defined to be a frying oil containing at least 5% of the fat/oil polymerized matters, it is necessary to discard the frying oil every 80 hours of the frying operation in the conventional fry cooking device referred to Example 10. In other words, it is necessary to use a large amount of a new frying oil every 80 hours of the frying operation. In the case of the present invention referred to in Example 10, however, the amount of the polymerized matter formed in the frying oil is maintained at 2.5% or less regardless of the time for the frying operation and, thus, the waste frying oil defined as above is not generated.

It is possible to carry out the method and operate the fry cooking device of the present invention with a smaller amount of the energy because, for example, the amount of the frying oil used is small relative to the amount of the frying ingredients, and the thermal efficiency is high. Particularly, it is desirable to carry out the fry cooking operation for a long time because the effect of lowering the energy used is increased with increase in the operating time. The energy lowering effect can be indicated by using a ratio of the amount of the electricity to the standard conventional method (reduction index of energy used). In the present invention, the amount of the electricity can be lowered to 0.7 or less, preferably to 0.65 or less, and more preferably to 0.6 or less, of that of the conventional standard method. In the case of carrying out a long time operation, it is possible to obtain a more improved energy lowering effect. Particularly, in the operation mode in which the frying operation is not continuously performed but is performed periodically or irregularly upon receipt of an order and, thus, the useless heating is relatively large, a further improved energy saving effect can be obtained, compared with the conventional method. According to the present invention, the lowering index of the energy used can be lowered to 0.15.

In order to decrease the amount of the frying oil in the frying oil layer, it is possible to use, for example, a flat and shallow frying oil layer. In this case, the frying oil tends to be deteriorated because the oil surface has a large area, leading to detrimental effects. For example, since the frying oil layer has a shallow bottom, the scorched fry coating attached to the heating device is attached again to the frying ingredients so as to impair the quality and the outer appearance of the fry cooked product. Where the frying oil layer has an oblong cross section longer in the vertical direction and the conditions specified in the present invention are satisfied, it is possible to decrease the amount of the frying oil in the frying oil layer and to increase the turnover rate while suppressing the deterioration of the frying oil and obtaining good effects on the fry cooked product.

By performing the fry cooking within the frying oil, not on the surface of the frying oil, a large amount of the frying ingredients can be fry cooked, and further, the fry cooking can be performed uniformly. Where the fry cooking is performed in the vicinity of the surface of the frying oil as in the conventional case, a large difference in temperature is generated between the portion extruding from the surface of the frying oil and the portion immersed within the frying oil, with the result that the fry cooking tends to be rendered nonuniform. In general, the frying ingredients are turned upside down during the fry cooking in order to eliminate the nonuniform fry cooking. However, the nonuniform fry cooking cannot be eliminated completely by this method. On the other hand, the frying ingredients are subjected to the fry cooking within the frying oil in the present invention so as to make it possible to heat the frying ingredients at the same temperature from the entire surface of the frying ingredients, with the result that the frying ingredients can be cooked uniformly.

Particularly, when it comes to the flat frying ingredients, the front and back surfaces of the frying ingredients can be subjected to the fry cooking uniformly without requiring the treatment that the frying ingredients are turned upside down and monitored all the time in order to fry uniformly the front and back surfaces of the frying ingredients.

Where the frying ingredients are cooked in a deep portion of the frying oil layer relatively long in the vertical direction, the frying oil is bubbled by the innumerable steam cells generated from the frying ingredients. As a result, the frying oil is stirred so as to produce the effect that the temperature within the frying oil layer is rendered uniform. In the method and the fry cooking device of the present invention, the cells generated from the frying ingredients are suitably involved in the convection within the frying oil layer so as to make the temperature of the frying oil uniform. In general, the upper and lower portions and the right and left portions of the frying oil layer considerably differ from each other in temperature. Also, the frying oil stays stationary between the frying ingredients and between the frying ingredients and the wall surface so as to bring about the temperature difference in the frying oil. In the method of the present invention, the stationary frying oil staying in the portions pointed out above is stirred by the bubbles generated from the frying ingredients so as to form the suitable frying zone referred to above. As a result, the frying ingredients can also be cooked uniformly. Such being the situation, the nonuniform frying can be prevented so as to obtain suitable fry cooked product that is heated uniformly.

In the method of preparing a fry cooked product of the present invention, the entire region of the frying ingredients can be subjected to a uniform fry cooking because the frying ingredients are subjected to the fry cooking within the frying oil and because the convection is brought about in the frying oil by the bubbling effect produced by the cells generated within the frying oil. The present invention also differs from the prior art in the outer appearance of fry cooking, too. In the conventional fry cooking in which the frying ingredients are allowed to float on the frying oil surface, the surface of the frying ingredients immersed within the frying oil and the surface positioned outside so as to be exposed to the outer air markedly differ from each other in the fried state, specifically, in the fried color, as well as in the fried state of the fry coating. In the present invention, however, the frying ingredients are fried uniformly in terms of the outer appearance. Also, according to the present invention, even where a plurality of different kinds of frying ingredients are subjected to the fry cooking at the same time, there is no difference in the outer appearance between the different kinds of the frying ingredients. In other words, the different kinds of the frying ingredients are subjected to the uniform fry cooking in the present invention.

Also, where the temperature in the central portion of the frying ingredients was measured after the fry cooking (or after a prescribed time), the nonuniformity of the temperature was found to be small in the case of the method and fry cooking device of the present invention. This supports that a plurality of frying ingredients are cooked uniformly.

Also, the frying ingredients are heated from the entire surface in the present invention. Therefore, depending on the frying ingredients, the method of the present invention permits shortening the fry cooking time in respect of the frying ingredients which are allowed to float on the frying oil surface for performing the fry cooking. It follows that the method of preparing a fry cooked product of the present invention makes it possible to improve the efficiency of the frying operation because many frying ingredients loaded at a high loading density are subjected to the fry cooking and it is possible to shorten the frying time in the present invention, as described above.

Further, in the method and the fry cooking device of the present invention, the temperature of the frying ingredients is elevated in a short time so as to proceed the fry cooking because the frying ingredients are heated from the entire surface, and the heating efficiency is high in the present invention.

In addition, the fry cooking is performed under the state of an excessively high density caused by the high loading density of the frying ingredients, with the result that a pressurized state is formed within the frying oil by the pressure of the water vapor generated from the frying ingredients. The particular pressurized state produces a desirable effect on the fry cooking. If the frying state is rendered satisfactory, it is expected to shorten the fry cooking time.

It should also be noted that, where the flat frying ingredients are held stationary by a carrier, it is possible to obtain the effect that the peeling of, for example, the fry coating can be markedly suppressed because of the synergetic effect produced by the conditions that the frying ingredients are held under a pressurized state and that the frying ingredients are held stationary. In the method and the fry cooking device of the present invention, the amount of the fry coating peeled from the frying ingredients is small. As a result, it is possible to suppress the deterioration of the frying oil and to suppress the amount of generation of the frying refuse generated as a waste material and attached to the fry cooked product so as to give adverse effect to the fry cooked product. To be more specific, the generation amount of the frying refuse can be suppressed in the present invention such that a ratio in the generation amount of the frying refuse for the present invention to that for the standard conventional method can be lowered to, for example, 0.8 or less, preferably to 0.75 or less, and particularly preferably to 0.7 or less. According to the present invention, the generation amount of the frying refuse can be lowered to 0.3 in terms of the ratio of the generation amount for the present invention to that for the standard conventional method. It is desirable to lower the generation amount of the frying refuse because the scorching, etc. of the peeled fry coating, which causes the deterioration of the frying oil, can also be suppressed. Also, the cleaning after the frying operation can also be facilitated.

In the present invention, the deteriorated material is suppressed to a low level, with the result that stains attached to the inner wall of the frying oil vessel can also be suppressed. Also, since the generation of polymerized matters and the frying refuse is small, the effect of suppressing the attachment of the frying refuse or the like to the inner wall of the frying oil vessel is prominently high. Also, the frying refuse or the like is likely to be attached most prominently to the inner wall in the vicinity of the frying oil surface. However, since the since the oil surface is greatly fluctuated by the bubbling effect caused by the cells generated within the frying oil layer, the stains are unlikely to be attached to the inner wall in the vicinity of the oil surface. Such being the situation, the present invention produces the effect of preventing the stains from being attached to the inner wall of the frying oil vessel, particularly, to that region of the inner wall of the frying oil vessel which is positioned in the vicinity of the frying oil surface to which a large amount of stains is attached in general.

Where the frying ingredients are subjected to the fry cooking under the state that the frying ingredients are allowed to float on the frying oil surface, the water is evaporated from the portion positioned above the frying oil surface or from the portion in the vicinity of the frying oil surface. On the other hand, where the fry cooking is performed under the state that the entire frying ingredients are immersed in the frying oil as in the present invention, all the evaporated water is generated within the frying oil so as to be propagated toward the frying oil surface. As a result, the water vapor concentration is rendered high in the vicinity of the frying oil surface. In other words, the oxygen concentration is rendered low in the vicinity of the frying oil surface so as to produce the effect of suppressing the deterioration of the frying ingredients during the fry cooking. In addition, in the method of preparing a fry cooked product of the present invention, the area of the oil surface in contact with the air is set small, compared with the conventional case, so as to produce a synergetic effect for suitably suppressing the deterioration.

The method of preparing a fry cooked product of the present invention is featured in that the water vapor is kept generated from the frying ingredients disposed within the frying oil during the fry cooking operation. In addition, the entire frying ingredients are covered with bubble and, thus, an undesired oil component is unlikely to be absorbed by the frying ingredients. It follows that an oily flavor is eliminated from the fry cooked product so as to improve the flavor of the fry cooked product. Also, an additional merit can be produced that, since the amount of the absorbed oil is small, the amount of the frying oil used can be decreased.

When it comes to the flat frying ingredients, various effects can be obtained as described previously by cooking the frying ingredients under the state that the frying ingredients are disposed such that the surface having a large flat area of the frying ingredients makes a prescribed angle with the frying oil surface. Further, the amount of the frying oil absorbed by the fry coating of the frying ingredients can be markedly decreased by taking the fried ingredients after the fry cooking out of the frying oil under the state described above. It is considered reasonable to understand that the area on which the frying oil is disposed is small when the fried ingredients are taken out of the frying oil, and the area of the lower surface of the frying ingredients is small. Where the fried ingredients are taken out of the frying oil such that the flat surface of the fried ingredients is held parallel to the frying oil surface, the fried ingredients are pulled upward with a large amount of the frying oil disposed on the flat surface of the fried ingredients. Also, the frying oil is held on the lower surface of the fried ingredients. It follows that a large amount of the frying oil is absorbed by the fried ingredients. In the present invention, however, this defect can be prevented by taking out the fried ingredients by the mode described above.

The fry cooked product obtained by the method of preparing a fry cooked product of the present invention is small in the amount of the frying oil absorption. Therefore, the fry cooked product is desirable in terms of the flavor because the fry cooked product is not oily. In addition, the calorific value of the fry cooked product obtained by the method of the present invention is smaller than that of the fry cooked product obtained by the conventional method and, thus, is desirable to those worrying about the calorific value. For comparison of the frying oil absorption amount between the present invention and the conventional method, it is possible to employ, for example, the oil absorption index, i.e., a ratio of the oil absorption for the present invention to the oil absorption in the case of the fry cooking by the standard conventional method. The frying oil absorption index noted above is not higher than 0.85, preferably not higher than 0.8, more preferably not higher than 0.75, and most preferably not higher than 0.725. Clearly, the frying oil absorption amount for the present invention is smaller than that for the standard conventional method. In the present invention, the oil absorption index can be lowered to 0.5.

As described above, according to the present invention, it is possible to decrease the amount of the frying oil used for the frying operation. It is also possible to improve the taste and flavor of the fry cooked product. Particularly, it is possible to suppress markedly the oily properties of the fry cooked product.

In the conventional frying operation, the scorching of the fry coating peeled off during the frying operation is disposed on the new frying ingredients in many cases so as to give adverse effects to outer appearance and the taste of the fry cooked product. However, where the fry cooked product is taken out of the frying oil layer at a prescribed angle as described above, the possibility for the fry cooked product to be taken out of the frying oil with the scorched coating disposed thereon is lowered. In this respect, it is desirable to take out the fry cooked product as specified in the present invention. The frying oil vessel used in the present invention has a rectangular cross section longer in the vertical direction as described previously. It follows that it is possible to suppress the movement of the scorched fry coating onto the fried ingredients, which is more desirable.

In the conventional frying method, the frying ingredients are put in a frying basket and put into the frying oil. In this case, the frying ingredients are rubbed with the basket at the interface between the frying ingredients and the frying basket. As a result, the bread powder layer of the frying ingredients are peeled off at a high frequency such that the peeling rate of the bread powder is increased to 2% or more. In the fry cooking device of the present invention, however, the flat ingredients such as a croquette is fixed to a carrier for performing the fry cooking. It should be noted that the contact area between the frying ingredients and the carrier is very small, and the croquette is fixed. In addition, the croquette is fixed to form a prescribed angle with the frying oil surface. It follows that the air bubbles are smoothly released and, thus, the frying ingredients are not vibrated. In addition, the surface of the frying ingredients is scarcely rubbed with the carrier. Such being the situation, the peeling rate of the bread powder is low. For example, it is possible to lower the peeling rate of the bread powder to, for example, 1.0% or less, preferably to 0.7% or less, more preferably to 0.5% or less, and most preferably to 0.3% or less.

In addition, according to the present invention, it is possible to suppress the deformation such as warping of the ingredients, particularly, the flat ingredients, after the fry cooking, to a low level if the fry cooking is performed with the frying ingredients fixed to a carrier. As a result, the fry cooked product presents a good outer appearance.

According to the method of preparing a fry cooked product of the present invention, the deteriorated materials present in the frying oil can be maintained at a low level as described previously. For example, when it comes to the polymerized matter, which is a thermally deteriorated material, it is possible to lower the polymerized matter content to 5% or less under the turnover rate of 2(%/hour), to 4% or less under the turnover rate of 3(%/hour), or to 3% or less under the turnover rate of 5(%/hour). It is also possible to suppress appropriately the deteriorated material such as a free fatty acid. Further, it is possible to suppress the elevation in the chromaticity of the frying oil and the elevation of the viscosity.

The polymerized matter content is increased with time during the fry cooking stage so as to reach several percent to about 20% in the conventional fryer. The fat/oil having an increased polymerized matter content are caused to present an unpleasant taste (a rough taste) so as to impair the flavor of the fry cooked product. Also, the resinous stains strongly attached to the inner surface of the frying oil vessel are increased so as to markedly impair the cleaning capability of the cooking apparatus. Further, the detrimental effects given by the polymerized matter to the human body are also suggested.

In European countries, the amount of the polar compound is used in general as an index for determining the deterioration of the frying oil. The amount of the polar compound should be, for example, not larger than 10% by mass, preferably not larger than 8% by mass, and more preferably not larger than 7% by mass. The polar substance is a generic name of those having an electrical polarity among the substances generated by the deterioration of the frying oil. The major portion of the polar compounds is a polymerized matter. Such being the situation, the amount of the polymerized matter provides an effective index.

It is desirable to suppress the amount of the polymerized matter contained in the frying oil to a level as low as possible. For example, the polymerized matter concentration in the frying oil should be lowered to 5% by mass or less, preferably to 4.5% by mass or less, more preferably to 4% by mass or less, furthermore preferably to 3.5% by mass or less, and most preferably to 3% by mass or less. The concentration of a tetramer or higher polymer should be not higher than 1.0% by mass, preferably not higher than 0.75% by mass, and more preferably not higher than 0.5% by mass. These high polymers can be analyzed by the conventional method by the liquid chromatography.

According to the method of preparing a fry cooked product and the fry cooking device of the present invention, it is possible to suppress markedly the generation of the polar compounds, e.g., polymerized matters, compared with the prior art so as to maintain the polar compound concentration at a low level. When it comes to a ratio of the polymerized matter concentration for the present invention to that for the standard conventional method (polymerized matter index), the polymerized matter index for the present invention is not higher than 0.75, preferably not higher than 0.7, more preferably not higher than 0.65, and particularly preferably not higher than 0.6. Particularly, the concentration of the high polymers of tetramers or higher can be further lowered so as to maintain a low concentration of the high polymers. For example, the polymerized matter index for the present invention in respect of the high polymers is not higher than 0.7, preferably not higher than 0.65, more preferably not higher than 0.6, and particularly preferably not higher than 0.55.

According to the method of the present invention, it is possible to suppress the deterioration of the frying oil. This naturally covers the case where content of the deteriorated material is used as the index. In addition, the particular effect can be felt in terms of the flavor of the fry cooked product. For example, the effect pointed out above can be grasped by the odor of the deterioration generated from the fat/oil used for fry cooking. The odor of the deterioration affects the flavor of the fry cooked product and the atmosphere of the working environment. Naturally, it is important to suppress the generation of the odor of the deterioration in the actual frying operation. According to the method of the present invention, it is possible to suppress the generation of the odor of the deterioration. The odor of the deterioration can be compared with that for the prior art by the organoleptic evaluation as well by the comparison in the generation amount of acrolein or 2,4-heptadienal. Where, for example, the present invention is compared with the standard conventional method in respect of the generation amount of such a chemical compound, the present invention makes it possible to lower the ratio of the generation amount to that for the standard conventional method to 0.9 or less, preferably to 0.89 or less, and more preferably to 0.88 or less. In general, the ratio noted above is 0.2 or more.

As described previously, the present invention makes it possible to suppress the deterioration of the frying oil and to increase the turnover rate. As a result, it is quite unnecessary to renew the fat/oil in the fat/oil layer for a long period, which is 2 to 10 times as long as that for the conventional fry cooking in the conventional frying oil layer. This is advantageous in terms of the cost and the environmental pollution problem because the frying oil must be bought and the waste oil must be disposed of. Also, the amount of the frying oil (the amount of fat/oil in the frying oil layer) used in the present invention is small, i.e., 0.3 to 0.75 times as much as that for the conventional case relative to a prescribed amount of the frying ingredients. Naturally, it suffices for the amount of the fat/oil that is discarded or renewed to be small. Also, it suffices for the amount of the fat/oil required for the continuous use for a prescribed period to be markedly small.

In the method and fry cooking device of the present invention, the area of the frying oil surface is small, compared with the prior art. As a result, the area from which the odor is generated is small. Also, since the deterioration of the frying oil is low, the odor is unlikely to be generated. Such being the situation, it is possible to suppress the odor generated in the working environment or within the shop. The effect of suppressing the odor generation can be evaluated by an odor sensor or by an organoleptic evaluation. The effect of suppressing the odor generation can be indicated by a ratio of the odor generation suppressing effect for the present invention to that for standard conventional method (odor generation suppressing index). The present invention permits the odor generation suppressing index to fall within a range of 0.2 to 0.8, preferably 0.3 to 0.7, and more preferably 0.4 to 0.6. As a result, the working environment can be improved, which is desirable to the worker. In addition, where the fry cooking is performed within a shop, the odor within the shop can also be improved, which is desirable to the purchaser, too.

The deteriorated substances refer to, for example, free fatty acids, diglyceride, monoglyceride, glycerin, fat/oil polymerized matter, alcohols, aldehydes, hydrocarbons, epoxy compounds, ketones and polar compounds.

It has been found in the present invention that the amount of the deteriorated substances within the fat/oil can be decreased by setting the turnover rate value defined below at 2 or more. Specifically, the turnover rate value noted above denotes a ratio of the turnover rate for the present invention to the turnover rate, which is set at 1, in the case of performing the frying operation under the standard conventional conditions, in which the ingredient loading rate is set at 6%, and the ratio $HA/SA^{1/2}$ is set at 0.3. The turnover rate for the present invention denotes the turnover rate in the case of performing the same frying operation in the method of preparing a fry cooked product and the fry cooking device of the present invention. In the present invention, the turnover rate value should be 2 or more, preferably 3 or more, more preferably 4 or more, and most preferably 5 or more.

The edible fats/oils used in the present invention used for fry cooking include, for example, plant fats/oils, animal fats/oils, diglyceride and edible refined fats/oils. These fats/oils include discolored oils before the deodorizing process as well as process oils such as extracted oils, raw oils, deoxidized oils, de-gummed oils and dewaxed oils, and refined oils. The plant fats/oils used in the present invention include, for example, a soybean oil, a soybean germ oil, a rapeseed oil, a corn oil, a sesame oil, a sesame salad oil, a beefsteak plant oil, a linseed oil, a peanut oil, a safflower oil, a high oleic acid safflower oil, a sunflower oil, a high oleic acid sunflower oil, a cotton seed oil, a grape seed oil, a macademia nut oil, a Hasel nut oil, a pumpkin seed oil, a walnut oil, a camellia oil, a tea seed oil, a perilla oil, a bollarge oil, an olive oil, a rice bran oil, a wheat germ oil, palm oil, palm olein, palm nuclear oil, a coconut oil, a cacao fat, algae oil, and fractionated oils thereof, tough the plant fats/oils used in the present invention are not limited to those exemplified above. The animal fats/oils used in the present invention include, for example, tallow, lard, a hen oil, a milk fat, a fish oil, a seal oil and fractionated oils thereof, though the fats/oils used in the present invention are not limited to those exemplified above. Diglyceride is a diester between glycerin and a fatty acid derived from an animal oil. It is possible to use a diglyceride prepared by hydrolyzing a fat/oil, followed by refining the hydrolyzate, or a diglyceride prepared by refining an ester formed between glycerin and a fatty acid, though the diglyceride used in the present invention is not limited to those exemplified above. Further, refined and processed edible fats/oils used in the present invention include, for example, the plant fats/oils pointed out above, the hydrogenated animal fats/oils pointed out above, synthetic fats/oils such as a middle chain fatty acid triglyceride (MCT) and triacetin, and an ester exchanged oil (MLCT), though the refined and processed edible fats/oils used in the present invention are not limited to those exemplified above.

The term "frying" used herein denotes the cooking method under heat using a relatively large amount of fats/oils as the heating medium such as frying, frying without coating, tempura, and koromoage. The kinds, shapes, etc. of the ingredients are not particularly limited.

The ingredients subjected to the fry cooking in the present invention include, for example, a croquette, a pork cutlet, a fried meat cake, a fried product without coating, a fried fishes and shellfishes, a fried meat, fried vegetables, a fried oyster, tempura, a ham cutlet, a fried potato, fried meat balls, a pre-fried type tempura, a fried rice confectionery (such as a fried rice cracker), a fried snack, a fried bean curd, fried fish balls, American dog, a curry bread, piroshki, and harumaki. Particularly, the flat ingredients include, for example, a croquette, a port cutlet, a fried meat cake, a ham cutlet, and fried fishes.

In the present invention, the shapes, materials, etc. of the ingredients are not particularly limited. It is possible to adjust appropriately the shapes, materials, etc. of the ingredients in accordance with the frying time and the object. When it comes to the oil absorbing properties of the frying ingredients themselves, it is desirable for the oil absorption to be low in view of the amount of use of the frying oil. By contraries, in order to increase the turnover rate, it is desirable for the oil absorption to be high in view of the aspect of suppressing the increase in the amount of the deteriorated substances contained in the frying oil. In the present invention, it is desirable to use the frying ingredients having an oil absorption rate not lower than 5% by mass, preferably not lower than 10% by mass, and more preferably not lower than 15% by mass. The frying ingredients having such a high oil absorption rate include, for example, the frying ingredients having coatings such as a croquette, a fried shrimp or prawn, and a pork cutlet.

In terms of the flavor and taste, it is desirable for the fry cooked product of the present invention to be fragrant, not to be oily, and to be crisp in view of the effects that the oil absorption of the ingredients is small, that every region of the ingredients is uniformly fried, and that the frying is performed under a pressurized state. Also, one of the factors giving good influences to the flavor and taste noted above is that the amount of the deteriorated materials contained in the frying oil is suppressed.

A suitable fry cooking device used in carrying out the method of preparing a fry cooked product of the present invention, includes a device meeting the relationship of $HB/SB^{1/2}=0.8$ to 4.0, preferably 0.9 to 3.5, more preferably 1.0 to 3.25, most preferably 1.1 to 3.0, where SB denotes the cross sectional area on the horizontal plane in the open portion of the frying oil vessel corresponding to the frying oil surface, and HB denotes the depth corresponding to the distance between the open portion and the bottom of the frying oil vessel. For performing the method of preparing a fry cooked product of the present invention, it is necessary for the volume of the frying oil layer to be set somewhat larger than that specified in the method of preparing a fry cooked product. The fry cooking device of the present invention includes a small type, a desk-top type, a domestic type, a middle type, a large type and a business type fry cooking devices. Each of the small type, desk-top type and domestic type fry cooking devices includes a frying oil vessel housing about 5 L or less of the frying oil. Concerning the size of the frying oil vessel in this case, it is desirable for the height HB to fall within a range of 15 cm to 25 cm and for the surface area SB to fall within a range of 200 $cm^2$ to 500 $cm^2$. Also, the middle type, large type or business type fry cooking device includes a frying oil vessel housing about 5 to 50 L of the frying oil. Concerning the size of the frying oil vessel in this case, it is desirable for height HB to fall within a range of 25 cm to 70 cm and for the surface area SB to fall within a range of 300 $cm^2$ to 1000 $cm^2$. It should be noted that the dead space can be diminished in the middle type or large type fry cooking device, so as to make it possible to control suitably the loading rate of the frying ingredients and the turnover rate. It follows that it is possible to suppress easily the deterioration of the frying oil, compared with the small type fry cooking device. In the middle type and large type fry cooking device, the frying oil vessel is relatively deep and, thus, it is possible to stack the carriers each having the frying ingredients disposed thereon to form two or three stage structure and to immerse the stacked carrier structure in the frying oil vessel for performing the fry cooking. In the embodiment of this mode, the dead space is small, as described above, so as to make it possible to dispose effectively the frying ingredients over a large frying oil layer region forming the frying zone. It follows that the effect of the present invention can be produced suitably and effectively.

The effects produced by the use of the fry cooking device described above are as described previously in conjunction with the method of preparing a fry cooked product. The fry cooking device of the present invention is constructed to achieve the object of suitably obtaining the effects described above and to achieve the above-noted object efficiently by means of, for example, automation of the apparatus. The working environment is also important and, thus, a sufficient attention is also paid to the working environment.

Figure 2:
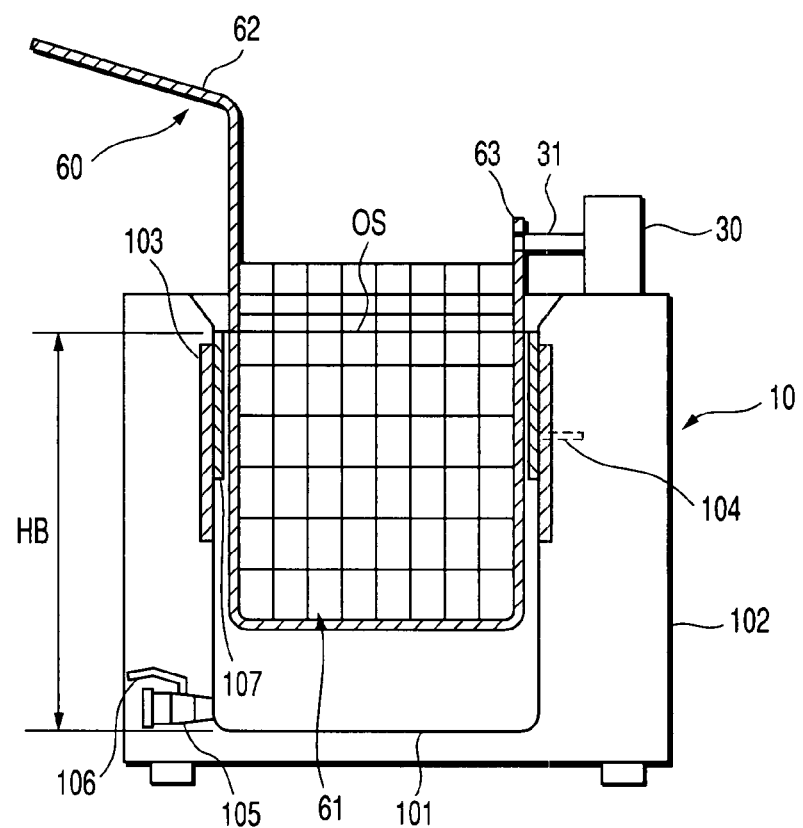
FIG. 2 is a cross sectional view schematically showing the construction of the fry cooking device in the fryer apparatus shown in FIG. 1.

FIG. 1 is an oblique view exemplifying the construction of a fryer apparatus of the present invention, and FIG. 2 is a cross sectional view schematically showing the construction of a fry cooking device 10 included in the fryer apparatus shown in FIG. 1. As shown in these FIGURES, the fryer apparatus of the present invention comprises the fry cooking device 10 of the present invention and a control box 40 equipped with a frying oil supply mechanism juxtaposed to the fry cooking device 10.

The fry cooking device 10 comprises a cylindrical frying oil vessel 101 having a bottom and longer in the vertical direction. In FIGS. 1 and 2, the frying oil vessel 101 is shaped substantially parallelepiped having four sidewalls and a single bottom wall. The frying oil vessel 101 is surrounded by a casing 102 with a prescribed distance provided therebetween. The casing 102 defines as a whole the shape of the frying oil vessel 101. The outer side surfaces of the frying oil vessel 101 are surrounded by a heater unit 103 for heating the frying oil loaded in the frying oil vessel 101. Also, a fluororesin coating layer 107 is formed in an upper portion on the inner surface of the frying oil vessel 101. Since the fluororesin has a low thermal conductivity, the frying oil in the vicinity of the oil surface is prevented from the over-heating so as to suppress the deterioration of the frying oil. Also, the heat dissipation from within the frying oil vessel 101 is suppressed by the fluororesin coating layer 107 so as to decrease the amount of the heat energy used.

Preferably, a lift mechanism 30 is mounted on the casing 102, for moving in the vertical direction an ingredient carrier 60 having the frying ingredients disposed thereon for immersing the frying ingredients in the frying oil layer for fry cooking. The lift mechanism 30 serves to facilitate the movement of the frying ingredients into and out of the frying oil vessel 101 that is relatively long in the vertical direction. The ingredient carrier 60 is hung from a support member 31 that is moved in the vertical direction, so as to be moved in the vertical direction within the frying oil layer. The fry cooking can be started by turning on a power source 41 and by depressing a switch 42 so as to permit the ingredient carrier to be moved downward together with the support member 31 and immersed in the frying oil layer as well as to drive the heater unit 103. After the time set for frying, the ingredient carrier 60 is moved upward so as to finish the frying operation. Incidentally, a temperature sensor 104 is inserted through the wall of the frying oil vessel 101 so as to reach the inner surface of the frying oil vessel 101, thereby detecting the temperature of the frying oil within the frying oil vessel 101.

As already described, in the fry cooking device of the present invention, the square root of the area SB of the open portion corresponding to the oil surface OS of the frying oil vessel 101 and the depth HB from the open portion to the bottom of the frying oil vessel 101 are defined to meet the relationship of $HB/SB^{1/2}=0.8$ to 4.0. It should be noted that the open portion corresponding to the oil surface OS referred to above denotes the open portion in the oil surface that is formed by the fat/oil when the fat/oil is loaded in the frying oil vessel 101 in an amount of about 70% of the inner volume of the frying oil vessel 101. As described previously, $HB/SB^{1/2}$ noted above is preferably 0.9 to 3.5, more preferably 1.0 to 3.25, and most preferably 1.1 to 3.0.

A discharge port 105 for discharging the waste frying oil from within the frying oil vessel 101 is mounted to the bottom portion of the frying oil vessel 101, and an opening-closing cock 106 is mounted on the discharge port 105.

As shown in FIG. 1, the fry cooking device 10 of the present invention is preferably provided with an opening-closing lid 20 for opening or closing the open portion of the frying oil vessel 101. With the provision of the lid 20, the amount of the heat dissipation can be suppressed so as to save the heat energy by closing the frying oil vessel 101 with the lid 20. Also, the dissipation of the odor can be further suppressed by closing the lid 20, and contact of the frying oil with the oxygen contained in the air can be suppressed by closing the lid 20 so as to suppress the deterioration of the frying oil. It is more desirable to mount a switch 21 interlocked with the opening-closing of the lid 20 so as to drive the temperature control mechanism described in the following such that, when the lid 20 is closed, the set temperature of the frying oil is lowered (by, for example, 30° C.) so as to prevent an undesired heating of the frying oil and, when the lid 20 is opened, the set temperature is brought back to the original state so as to rapidly elevate the temperature of the frying oil in preparation for the start-up of the frying operation.

The control box 40, which is equipped with a frying oil supply mechanism and juxtaposed to the fry cooking device 10, serves to control automatically the various operations, and includes a circuit constructed as shown in FIG. 3. To be more specific, a semi-conductor non-contact relay 401 connected to the power source switch 41 and a digital timer 402 connected to the start/reset switch 42 are arranged within the control box 40. The semiconductor non-contact relay 401 is connected to a digital temperature adjuster 403 within the control box. A signal supplied from the temperature sensor 104 and another signal supplied from the switch 21 interlocked with the lid 20 are supplied to the digital temperature adjuster 403. As a result, the heater unit 103 mounted on the fry cooking device 10 is operated as described previously through the semiconductor non-contact relay 401. On the other hand, the digital timer 402 drives as described above a lift device 201 connected to the support member 31 of the lift mechanism 30.

Figure 4:
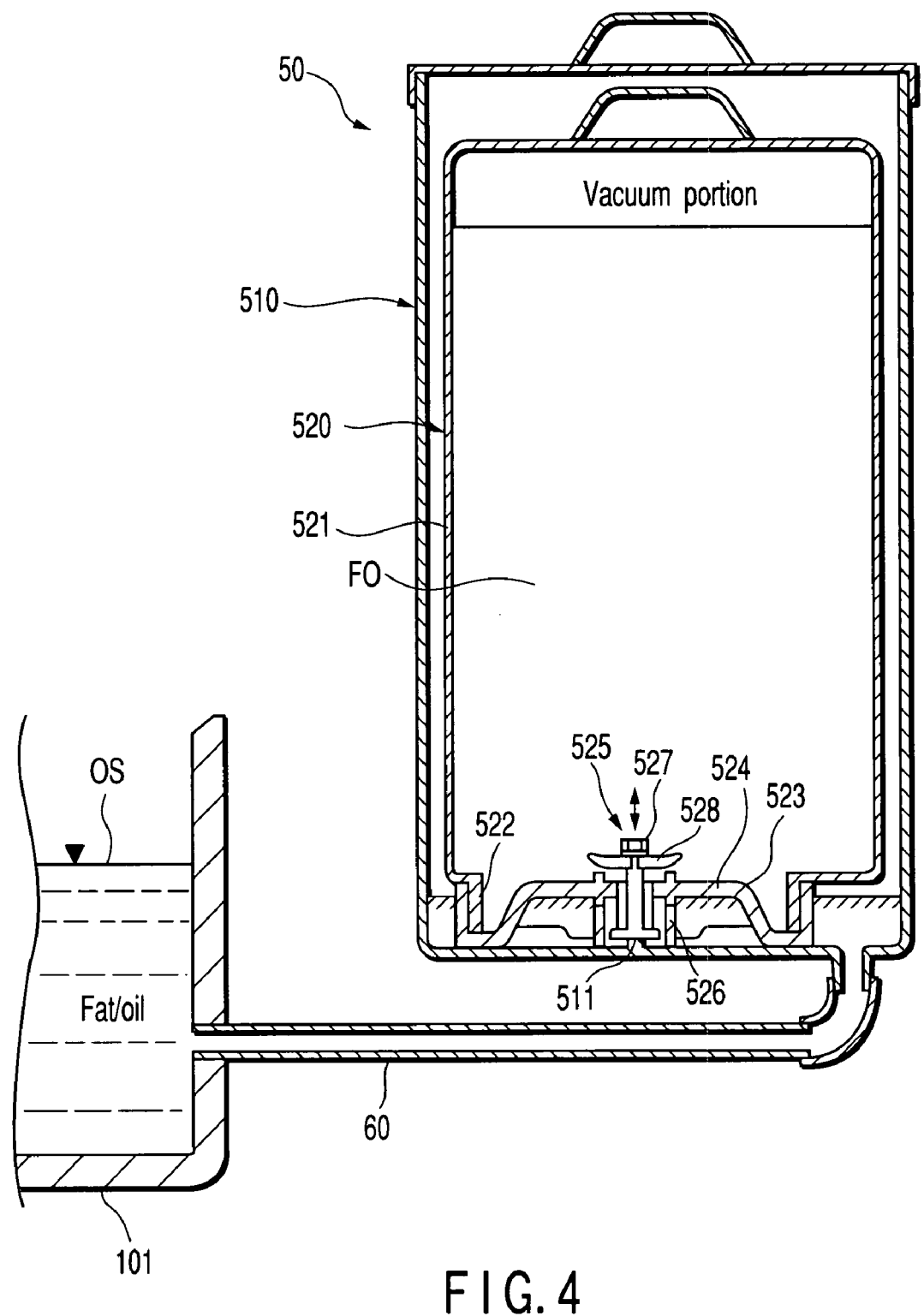
FIG. 4 is a cross sectional view schematically showing the construction of the oil supply mechanism.

The frying oil supply mechanism 50, which is mounted on the control box 40, is equal in the operating principle to the oil supply mechanism using, for example, a cartridge tank in a petroleum stove, and comprises a receiver tank 510 and a fat/oil cartridge tank 520 that can be mounted on the receiver tank 510, as shown in FIG. 4. The receiver tank 510 is inserted through an opening 51 formed in an upper surface of the control box 40. The cartridge tank 520 is formed of a cylindrical body 521 having a bottom and includes an open portion 522 having a diameter smaller than that of the cylindrical body 521. A cap 523 is externally threaded in the open portion 522. The cap includes a flat protruding portion 524 protruding into the inner region of the cylindrical body 521 from the open edge of the cylindrical body 521, and a valve unit 525 is mounted in the central portion of the cap 523. The valve unit 525 is comprised of a nut 527 surrounded by a cylindrical member 526, which has a lower end abutting against the bottom portion of the receiver tank 510 and has an upper surface extending from the flat protruding portion 524 into the inner region of the cartridge tank 520. The nut is arranged in the cylindrical member so as to be movable in the vertical direction through the flat protruding portion 524. A parison 528 serving to hermetically close the cylindrical member 526 when the parison 528 abuts against the upper edge surface of the cylindrical member 526 is formed in an upper portion of the nut 527. A spring member 528 is arranged around the nut 527. When the cartridge tank 520 is not inserted into the receiver tank 510, the parison 528 abuts against the upper edge surface of the cylindrical member 526 so as to hermetically close the cylindrical member 526. As a result, the frying fat/oil FO housed in the cylindrical member 526 is prevented from leaking from the cylindrical member 526. If the cartridge tank 520 is housed in the receiver tank 510 as shown in FIG. 4, the nut 527 is pushed upward by a projection 511 formed in the center of the bottom surface of the receiver tank 510 so as to release the abutment between the cylindrical member 526 and the parison 528. As a result, the surrounding air enters the cylindrical member 526. It follows that the fat/oil FO is discharged into the frying oil vessel 101 to reach the level within the frying oil vessel 101 through a supply pipe 60 that permits the bottom portion of the receiver tank 510 to communicate with the frying oil vessel 101. If the level of the fat/oil FO is elevated, the air flowing port is closed so as to form a vacuum portion within the cartridge tank 520, and the level is rendered constant at the time when the pressure is balanced. The operation described above is repeated so as to automatically supply a desired amount of the fat/oil FO into the frying oil vessel 101. Incidentally, it is desirable for the cartridge tank 520 to be formed of a transparent material such that the residual amount of the fat/oil FO housed in the cartridge tank 520 can be visually observed. Also, it is desirable for the receiver tank 510 to be provided with a window such that the residual amount of the fat/oil FO within the receiver tank 510 can be visually observed.

Table 1 shows some examples in respect of the specific size of the frying oil vessel included in the fry cooking device of the present invention, the amount of frying oil used, the number of frying ingredients, and the loading rate of the frying ingredients in comparison with the values for the typical conventional fry cooking device.

TABLE 1

| Fry cooking device | Nominal oil amount (L) | Oil vessel | | | | | | Oil | | Frying ingredients | Vertical type parameter | | Loading rate*4 % |
| | | Width W cm | Length D cm | Height HB cm | Vol. VB L | Oil surface area SA $cm^2$ | Open portion area*1 SB $cm^2$ | Practical max. oil amount*2 VA L | Max. height HA cm | Max. number of products*3 Number | Oil H/$\sqrt{SA}$ | Open portion of vessel HB/$\sqrt{SB}$ | |
| --- | --- | --- | --- | --- | --- | --- | --- | --- | --- | --- | --- | --- | --- |
| Invention 1 | 0.4 | 8 | 5 | 17 | 0.68 | 40 | 40 | 0.48 | 11.9 | 2 | 1.88 | 2.69 | 29.6 |
| invention 2 | 1.0 | 8 | 10 | 17 | 1.4 | 80 | 80 | 1.0 | 11.9 | 4 | 1.33 | 1.90 | 29.6 |
| Invention 3 | 1.5 | 9 | 16 | 17 | 2.4 | 144 | 144 | 1.7 | 11.9 | 4 | 0.99 | 1.42 | 18.9 |
| Invention 4 | 2.0 | 10 | 18 | 18 | 3.2 | 180 | 180 | 2.2 | 12.3 | 5 | 0.91 | 1.30 | 18.5 |
| Invention 5 | 3.0 | 16 | 18 | 18 | 5.8 | 288 | 288 | 4.0 | 14.0 | 8 | 0.82 | 1.18 | 16.8 |
| Invention 6 | 10.0 | 17 | 30 | 30 | 15.3 | 510 | 510 | 10.7 | 21.0 | 30 | 0.93 | 1.33 | 21.9 |
| Invention 7 | 12.0 | 20 | 30 | 30 | 18.0 | 600 | 600 | 12.6 | 21.0 | 30 | 0.86 | 1.22 | 19.2 |
| Invention 8 | 5,000 | 150 | 200 | 250 | 7,500 | 30,000 | 30,000 | 5,250 | 175 | 10,000 | 1.01 | 1.44 | 16.0 |
| Convent. 1 | 1.0 | 14 | 18 | 10 | 2.5 | 252 | 252 | 1.8 | 7.0 | 2 | 0.44 | 0.63 | 10.2 |
| Convent. 2 | 1.0 | Cylindrical: Diameter 20 cm | | 7 | 2.2 | 314 | 314 | 1.5 | 4.9 | 2 | 0.28 | 0.40 | 11.5 |

TABLE 1-continued

| Fry cooking device | Nominal oil amount (L) | Oil vessel | | | | | | Oil | | Frying ingredients Max. number of products*[3] Number | Vertical type parameter | | Loading rate*[4] % |
|---|---|---|---|---|---|---|---|---|---|---|---|---|---|
| | | Width W cm | Length D cm | Height HB cm | Vol. VB L | Oil surface area SA $cm^2$ | Open portion area*[1] SB $cm^2$ | Practical max. oil amount*[2] VA L | Max. height HA cm | | Oil $H/\sqrt{SA}$ | Open portion of vessel $HB/\sqrt{SB}$ | |
| Convent. 3 | 3.0 | 24 | 23 | 11 | 6.1 | 552 | 552 | 4.3 | 7.7 | 4 | 0.33 | 0.47 | 8.6 |
| Convent. 4 | 3.0 | 20 | 31 | 12 | 7.4 | 620 | 620 | 5.2 | 8.4 | 5 | 0.34 | 0.48 | 8.8 |
| Convent. 5 | 8.0 | 25 | 35 | 16 | 14.0 | 875 | 875 | 9.8 | 11.2 | 8 | 0.38 | 0.54 | 7.5 |
| Convent. 6 | 13.0 | 30 | 40 | 20 | 24.0 | 1,200 | 1,200 | 16.8 | 14.0 | 10 | 0.40 | 0.58 | 5.6 |
| Convent. 7 | 18.0 | 38 | 45 | 15 | 25.7 | 1,710 | 1,710 | 18.0 | 10.5 | 15 | 0.25 | 0.36 | 7.7 |
| Convent. 8 | 18.0 | 40 | 40 | 15 | 24.0 | 1,600 | 1,600 | 16.8 | 10.5 | 15 | 0.26 | 0.36 | 8.2 |

Notes:
[1] The area of the open portion of the frying oil vessel was set equal to the area of the frying oil surface.
[2] The practical maximum frying oil amount was set at 70% of the inner volume of the frying oil vessel.
[3] The maximum number of fried products that can be practically achieved simultaneously in terms of croquettes each sized at 6.5 cm × 9 cm × 2 cm and having a volume of 0.1 L.
[4] The loading rate was determined by: (amount of ingredients)/(amount of frying oil + amount of ingredients).

Figure 5:
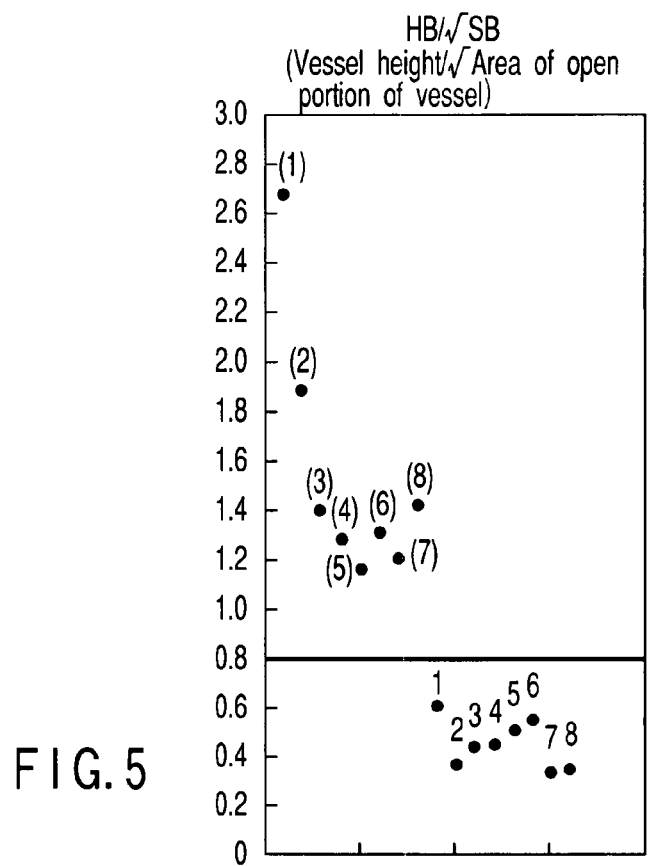
FIG. 5 is a graph in which the values of $HB/\sqrt{SB}$ for the fry cooking device of the present invention are plotted in comparison with the values for the conventional fry cooking device.

FIG. 5 shows the values of $HB/\sqrt{SB}$ for each of the fry cooking devices shown in Table 1. The number put in the parenthesis in FIG. 5 denotes the fry cooking device of the present invention, and the number without the parenthesis denotes the conventional fry cooking device. Also, the number itself denotes the apparatus number shown in Table 1.

Figure 6:
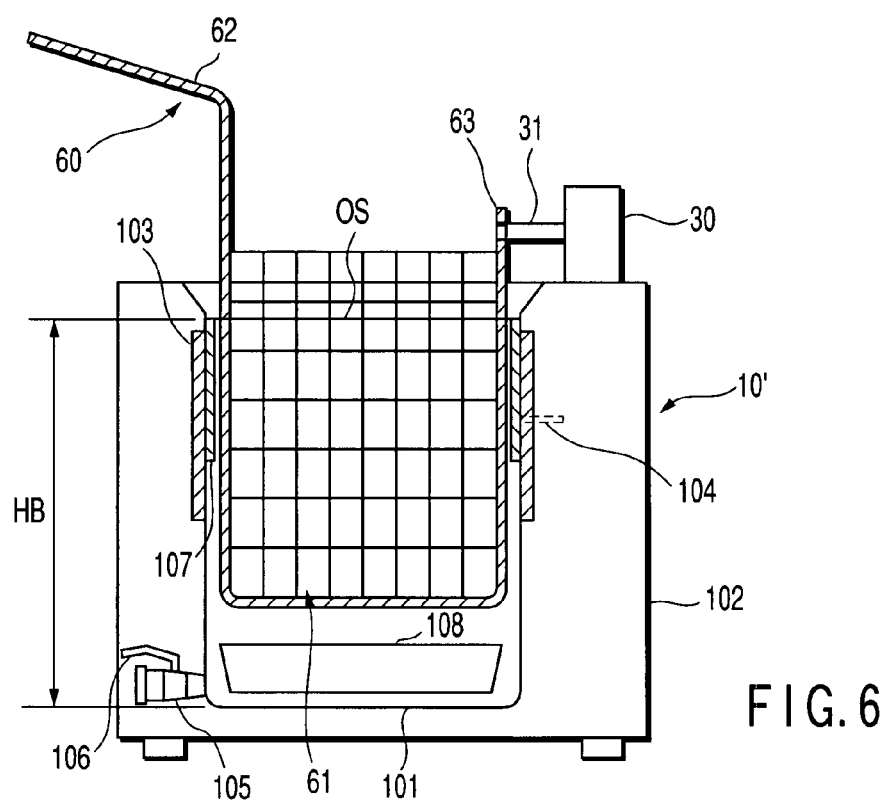
FIG. 6 is a cross sectional view schematically showing the construction of a fry cooking device according to another embodiment of the present invention.

It is desirable for the fry cooking device of the present invention to include a frying refuse removing member 108 receiving and housing the frying refuse as shown in FIG. 6. The fry cooking device 10' shown in FIG. 6 is equal in construction to the fry cooking device described previously with reference to FIGS. 1 and 2, except that the fry cooking device 10' includes an additional device of the frying refuse removing member 108. The frying refuse removing member 108 can be obtained by stretching a sheet-like mesh body at the bottom surface of a rectangular frame body. In the fry cooking device of the present invention, a heater unit for heating the frying oil is arranged on the side wall of the frying oil vessel in contrast to the conventional fry cooking device in which a heat transmitting device is arranged within the frying oil. Therefore, the frying refuse removing member 108 can be taken out easily after the ingredient carrier is taken out of the frying oil vessel upon completion of the fry cooking. To be more specific, in the conventional fry cooking device, it is dangerous to take out the frying refuse removing member unless the frying oil is withdrawn first from the frying oil vessel and the heat transmitting member is cooled. The particular operation is troublesome and the number of operations for removing the frying refuse is limited. In the present invention, however, the frying refuse removing member 108 can be taken out easily and efficiently. As a result, the frying oil is prevented from being colored by the heating of the frying refuse within the frying oil. Also, the quality of the resultant fry cooked product can be improved. Also, as described above, a heater unit for heating the frying oil is arranged on the side surface of the frying oil vessel in the fry cooking device of the present invention. It follows that the frying refuse removing member 108 arranged at the bottom surface of the frying oil vessel does not inhibit the transmission of the heat and the convection of the frying oil.

Figure 7:
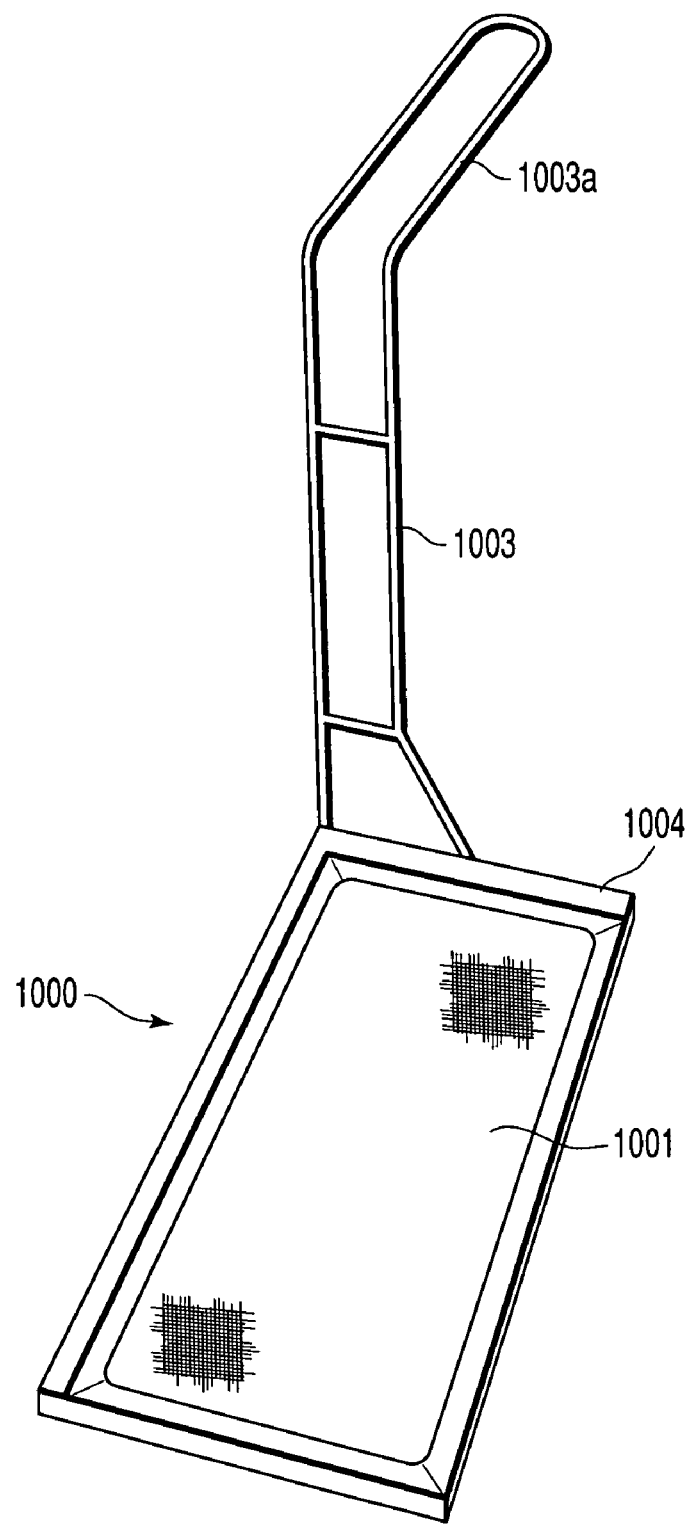
FIG. 7 is an oblique view showing a refuse removing member suitable for use in the fry cooking device of the present invention.

FIG. 7 shows a suitable example of a refuse removing member 1000. The refuse removing member 1000 is formed of a mesh-like sheet member (refuse receiving section) 1001, and a handle 1003 is connected to the sheet member 1001 in a direction perpendicular to the sheet member 1001. In general, a frame body 1004 is arranged to surround the periphery of the sheet member 1001 so as to prevent the dropping of the frying refuse. The handle 1003 extends vertically upward such that an upper portion of the handle 1003 is positioned above the surface of the frying oil layer, and an upper edge portion 1003a of the handle 1003 is inclined. It is possible to mount an inclination control member (not shown) to a part of the bottom portion of the sheet member 1001 so as to control the inclination of the sheet member 1001 such that the sheet member 1001 is held horizontally flat. The refuse removing member 1000 is disposed on the bottom portion of the frying oil layer during the frying operation, and the frying refuse is removed appropriately during or after completion of the frying operation.

The refuse removing member 1000 of the present invention, which is prepared by attaching the take-out handle 1003 to a mesh-like sheet member, is compact and makes it possible to remove easily the frying refuse. Since the refuse removing member 1000 is simple and can be operated easily, the refuse removing member 1000 can be used repeatedly for removing the frying refuse. It follows that the quality of the frying oil and the taste of the frying ingredients can be improved even if the fry cooking is performed under the same conditions. Particularly, the refuse removing member 1000 is suitable for use in the fry cooking device of the present invention in which a heat transmitting line is not arranged inside the frying oil layer. It is desirable to arrange the refuse removing member 1000 within the frying oil layer during the frying operation and to remove the frying refuse accumulated in the refuse removing member 1000 during the frying operation or after completion of the frying operation. It is most desirable to use the refuse removing member 1000 in a frying oil vessel having a substantially flat bottom surface, which is not necessarily a horizontally flat bottom surface. It is desirable to use the refuse removing member 100 in the case where the side wall of the frying oil vessel is heated as in the fry cooking device of the present invention, because the frying refuse is unlikely to be scorched in this case. It should be noted in this connection that the refuse removing member of the present invention is arranged in many cases in a position relatively close to the bottom surface of the frying oil vessel. The refuse removing member used in the conventional fry cooking device is shaped in general like a basket. However, in the case of using the refuse removing member of the present invention, it is possible to obtain the merits that it is possible to ensure a large cooking zone because the refuse removing member is compact, that the transmission of the heat from the heat transmitting surface and the convection of the heat are not obstructed, that the refuse removing member can be handled easily and cleaned simply, and that a large space is not required for housing the refuse removing member of the present invention. When it comes to the basket type refuse removing member used in the conventional fry cooking device, the frying oil is withdrawn first from the frying oil vessel after completion of a series of frying operations, followed by cooling the frying oil layer and the heat transmitting member arranged in the frying oil layer. Then, the heat transmitting member arranged within the frying oil layer is moved, followed by taking out the refusing receiving basket and discard the frying refuse from within the basket. The operations described above a highly laborious. Also, the number of operations is limited. Further, the operation itself tends to be disliked. On the other hand, the refuse removing member of the present invention is under the state that refuse removing operation can be performed any time. Also, the refuse removing operation can be carried out suitably. Such being the situation, the frying oil is prevented from being colored by the heating of the frying refuse. Also, the quality of the fry cooked product can be improved. As described above, the refuse removing member of the present invention permits improving the qualities of the frying oil and the fry cooked product, compared with the conventional refuse removing member. It should also be noted that, where a refuse removing member is not used, the waste oil discharge port tends to be clogged with the frying refuse. In this case, it is necessary to perform the removing operation using, for example, a rod for removing the clogging refuse. It is possible for the frying oil to flow out rapidly during the removing operation, which is highly dangerous. In the case of using the refuse removing member of the present invention, it is possible to overcome easily the problem pointed out above.

In the fry cooking device of the present invention, it is desirable for a turbo mechanism for rapidly heating the frying oil to be connected to the heater unit 103. FIG. 8 shows a circuit construction equal to that shown in FIG. 3, except that a turbo mechanism is included in the circuit construction shown in FIG. 8. As shown in FIG. 8, a turbo switch 404, which is driven by a button 405 mounted to the control box 40, is connected to the digital temperature controller 403. If the turbo switch 404 is inputted to the digital temperature controller 403, the proportional heating control achieved by the digital temperature controller 403 is released so as to permit the heater unit 103 to output the maximum heating so as to heat rapidly the frying oil. If the frying oil is heated rapidly, the heating time can be shortened, with the result that it is possible to suppress markedly the deterioration of the frying oil.

The turbo mechanism employed in the present invention is a system that is used, when a rapid heating is required, for achieving a strong heating for a prescribed time while disregarding the temperature control mechanism performing its function all the time. In general, the strength of the heating of the strong heating is determined by the capacity of the heater unit arranged in the frying oil vessel. Naturally, the upper limit of the heating strength represents the maximum output. In order to achieve an excellent rapid heating, it is possible to arrange a heater unit having a high capacity. However, it is inefficient in terms of the fry cooking itself and the power consumption to use the heater unit having a high capacity all the time. Such being the situation, the present inventors have found that it is possible to perform an excellent rapid heating only when required by using the turbo mechanism in the case of using an auxiliary heater unit. In this case, the rapid heating effect is excellent, and the power is consumed efficiently.

Needless to say, where the fry cooking is performed by using the fry cooking device of the present invention described above, the fry cooking is performed under the conditions specified for the method of preparing a fry cooked product of the present invention described previously. In this case, the frying ingredients can be put on the ingredient carrier 60 formed in the shape of a box 61 made of a lattice-shaped mesh member and can be immersed under the particular state in the frying oil layer, as shown in FIG. 2. The ingredient carrier 60 includes the handle 60 and a hanging portion 63 hanging from the support member 31 of the lift mechanism 30. The carrier 60 can be used as a general purpose ingredient carrier.

In general, the fry cooking device is purchased on the assumption of the maximum processing capability. If the fry cooking device is larger than as required, it is troublesome to handle the fry cooking device, and it is necessary to use an excessively large amount of the fat/oil. If the fry cooking device includes a frying oil vessel larger than as required, the turnover rate is lowered. Such being the situation, it is desirable to determine the number of fry cooking devices (frying oil vessels) used in conformity with the amount of the frying ingredients.

Where there are a plurality of frying oil vessels, it is possible to determine whether to use a single frying oil vessel or a plurality of frying oil vessels in accordance with the amount of the frying ingredients cooked in a day.

The fry cooking device of the present invention includes a deep frying oil vessel longer in the vertical direction. Therefore, the fry cooking device presents a compact outer appearance. Also, the fry cooking device of the present invention is a space-saving type fry cooking device that permits saving the space. For example, the ratio of the fry cooking device of the present invention to the conventional fry cooking device having the same fry cooking capability in terms of the bottom area is not larger than 0.7, preferably not larger than 0.65, and more preferably not larger than 0.6, which supports that the fry cooking device of the present invention is of a highly space-saving type. According to the present invention, the ratio noted above can be decreased to 0.2. An example is shown in Table A below.

In the case of using the fry cooking device of the present invention, there is an allowance in terms of the working space, and a small space can be combined effectively. Further, the workability can be improved by disposing the carrier, the frying ingredients, etc. in the space having an allowance.

TABLE A

| Comparison in Installing Space of Fry Cooking Device | | |
|---|---|---|
| | The Invention | Prior Art |
| Bottom area (cm$^2$) | 600 | 1300 |
| Bottom area ratio | 0.46 | — |

The fry cooking device of the present invention, which includes a frying oil vessel longer in the vertical direction than the frying oil vessel included in the conventional fry cooking device, seems slim, is compact in terms of the space, and is adapted for the situation that a plurality of the fry cooking devices are arranged side by side for the simultaneous operation. The fry cooking device of the present invention can also be used in a small working environment, can be installed in a small clearance, and can be used conveniently.

Also, where the purchaser can observe the frying operation, the good impression contributes to the promotion of the sale.

It should also be noted that a water vapor and an oil smoke are generated from the frying oil surface during the fry cooking operation. However, since the frying oil has a small surface area, the water vapor, the oil smoke, etc. are discharged from a single portion so as to facilitate the recovery and discharge of the waste gas, which is desirable in terms of the working environment. To be more specific, the generated water vapor, oil smoke, etc. rise upward in a columnar shape, which is highly desirable in terms of the waste discharge. It should also be noted that the fry cooking device of the present invention has a relatively small frying oil surface area, with the result that the odor generating area is also small and the deterioration of the frying oil can be suppressed. It follows that a bad odor is unlikely to be generated.

What should also be noted is that the heater unit is arranged on the side surface of the frying oil vessel in the fry cooking device of the present invention in contrast to the conventional fry cooking device in which the heater unit is arranged in the bottom portion of the frying oil bottom portion. In other words, the frying ingredients are disposed in the vicinity of the heat source, with the result that the central portion of the frying ingredients can be heated promptly by, for example, the heating, the radiation heat and the bubble convection.

Also, in the present invention, the amount of the frying oil used is small and, thus, the temperature elevation rate after initiation of the heating is high so as to make it possible to start the frying operation in a short time.

Further, the fry cooking device of the present invention permits prominently suppressing the increase with time in the amount of the deteriorated materials of the fat/oil, compared with the conventional fry cooking device, even if the turnover rate is the same. This feature and the high turnover rate of the present invention collectively produce an synergetic effect that the increase in the amount of the deteriorated materials of the fat/oil can be more prominently suppressed.

Also, the fry cooking device of the present invention includes a deep frying oil vessel longer in the vertical direction. Therefore, the scorched fry coating peeled from the frying ingredients so as to be present in the bottom portion is scarcely caused to float to the surface by the convection as in the conventional fry cooking device and thus, the detrimental effects such as the attachment of the scorched fry coating to the fry cooked product are unlikely to be generated in the present invention. Also, since the frying oil vessel is longer in the vertical direction, a heater can be mounted relatively easily on the side surface. In this case, the temperature of the frying oil in the bottom portion can be maintained at a low level, with the result that the fry coating peeled off during the frying operation is not scorched. Incidentally, as described above, where the frying ingredients are held upright during the fry cooking operation, the fry coating, etc. peeling from the frying ingredients is not picked up, which is more desirable.

Figure 9:
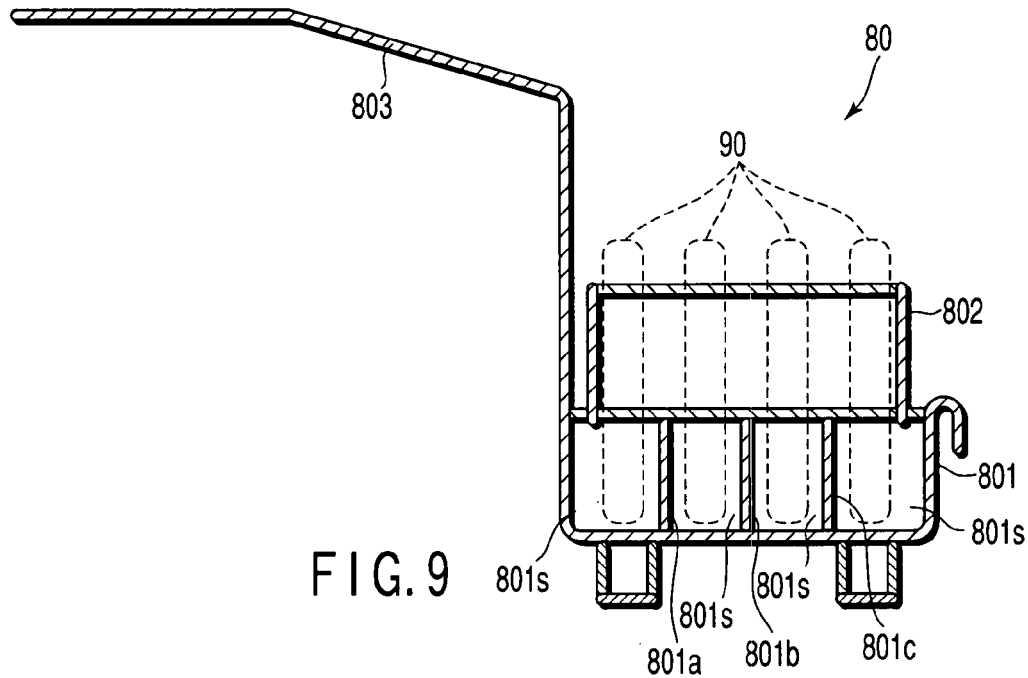
FIG. 9 is a side view showing an ingredient carrier for holding upright flat ingredients.

As described previously, it is desirable for the flat ingredients to be subjected to the fry cooking under the state that the flat ingredients are held to permit the large flat surface to form a prescribed angle with the surface of the frying oil. FIG. 9 shows an ingredient carrier 80 holding the flat frying ingredients such that the frying ingredients are held substantially perpendicular to the surface of the frying oil. The ingredient carrier 80 shown in FIG. 9 is formed in the shape of a box as a whole, and includes a lower frame body 801 and an upper frame body 802. A handle 803 is joined to the lower frame body 802. The lower frame body 801 is partitioned by a plurality of partition rods 801a to 801c into a plurality of small sections 801s in which the ingredients 90 are individually housed upright. On the other hand, the upper frame body 802 is constructed to support the plural ingredients 90 from the peripheries thereof.

Figure 10A:
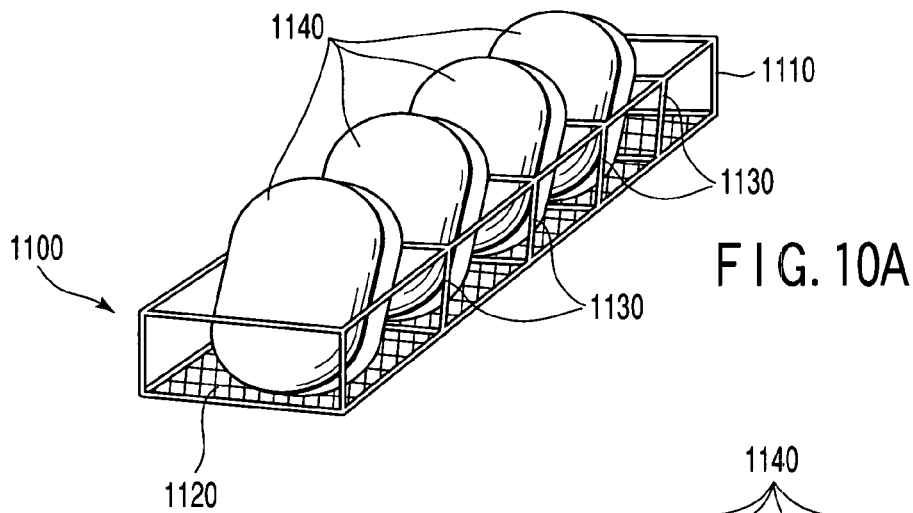
FIGS. 10A and 10B are an oblique view and a side view, respectively, showing an ingredient carrier for holding flat ingredients in an inclined state.
Figure 10B:
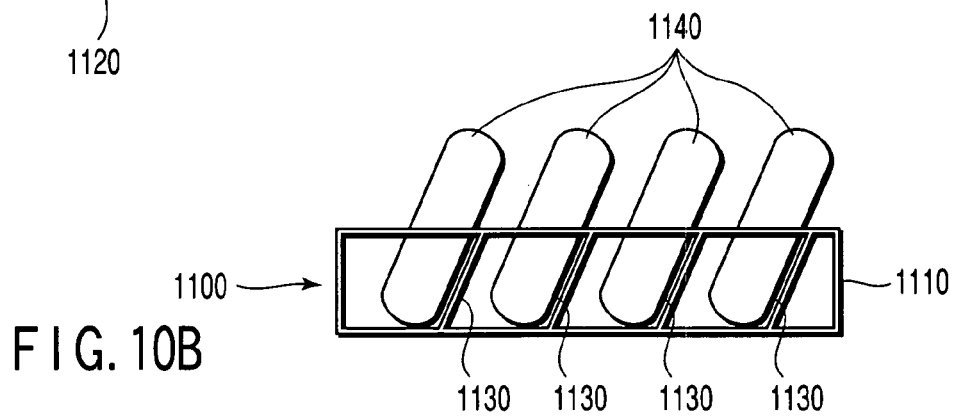

FIGS. 10A and 10B show ingredient carriers for holding the flat ingredients such that the flat surfaces of the ingredients are held inclined relative to the surface of the frying oil. FIG. 10A is an oblique view of an ingredient carrier 1100, and FIG. 10B is a side view showing the ingredient carrier 1100. The ingredient carrier 1100 shown in FIGS. 10A and 10B includes a parallelepiped open frame body 1110, and a support member 1120 formed of a mesh or a metal net, which supports the flat ingredients 1140 and permits the free passage of the frying oil, is stretched along the bottom surface of the open frame body 1110. The inner space of the parallelepiped open frame body 1110 is partitioned by a plurality of inclined partition frames 1130 so as to form a plurality of inclined free spaces, and the ingredients 1140 are housed in the inclined spaces thus partitioned. Needless to say, the angle of inclination of the inclined partition frame 1130 falls within the range of the angles made between the flat surface of the flat ingredients and the surface of the frying oil referred to previously.

If the frying ingredients are held inclined relative to the surface of the frying oil in this fashion, it is possible to hold even the frying ingredients which are relatively soft. Also, it is possible to prevent the frying ingredients from rising onto the surface of the frying oil during the fry cooking operation. In addition, where the carrier housing the fry cooked product is taken out of the frying oil vessel after the fry cooking for display of the fry cooked product, the fry cooked product can be presented to the consumer under the state that the large flat surface of the frying ingredients is inclined. As a result, the outer appearance of the fry cooked product can be improved.

Figure 11:
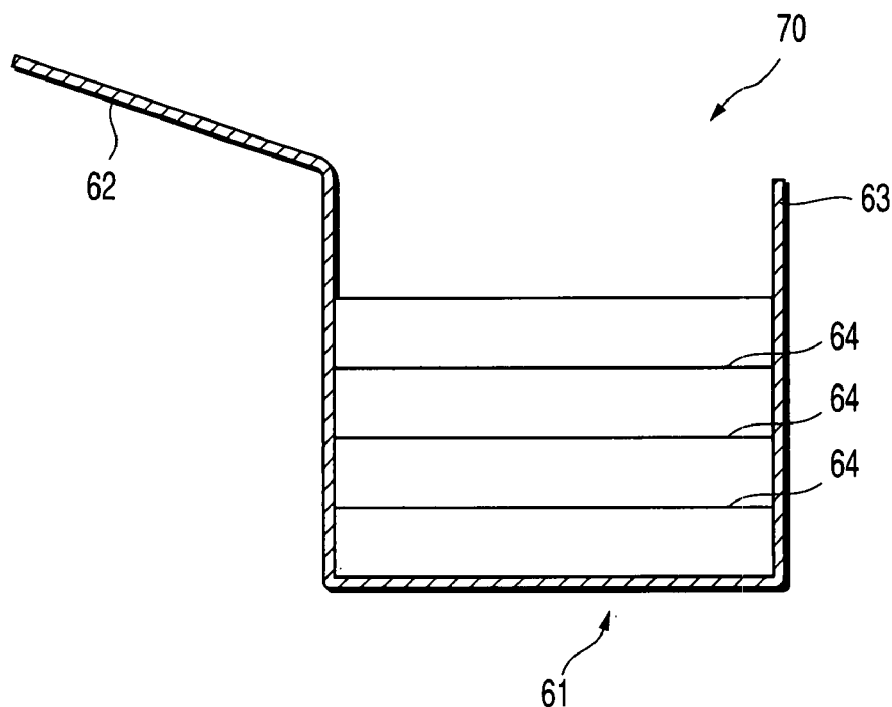
FIG. 11 is a side view showing the construction of an ingredient carrier equipped with a plurality of racks for holding the ingredients.
Figure 13:
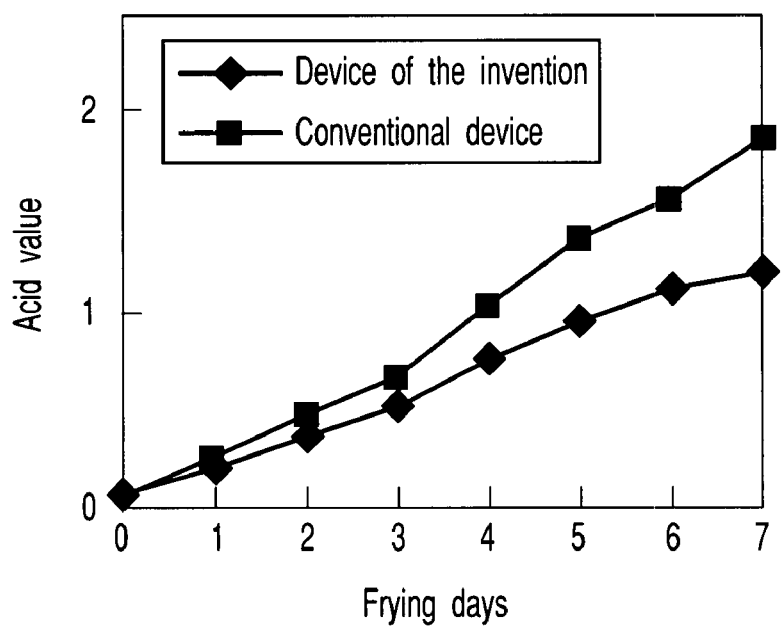
FIG. 13 is a graph showing the relationship between the number of frying days and the acid value of the frying oil for Example 1.
Figure 14:
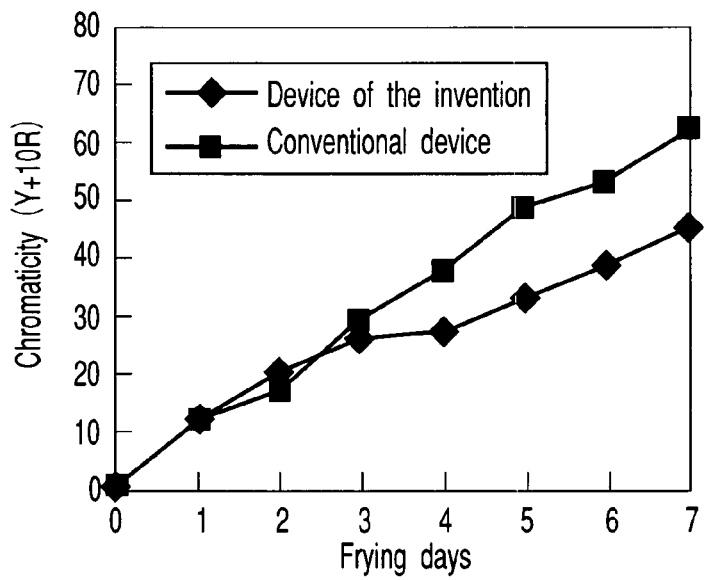
FIG. 14 is a graph showing the relationship between the number of frying days and the chromaticity of the frying oil for Example 1.
Figure 15:
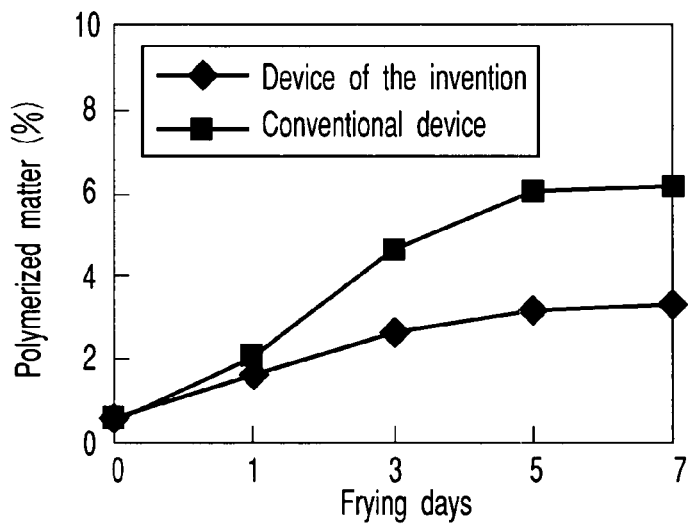
FIG. 15 is a graph showing the relationship between the number of frying days and the polymerized matters formed in the frying oil for Example 1.
Figure 16:
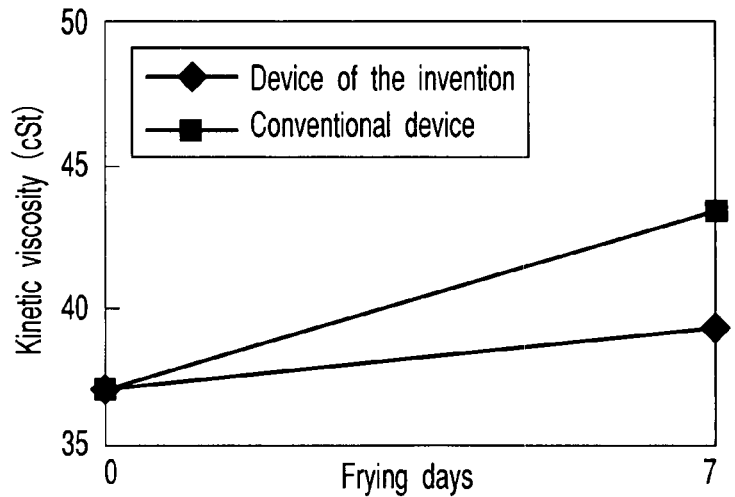
FIG. 16 is a graph showing the relationship between the number of frying days and the kinetic viscosity of the frying oil for Example 1.
Figure 17:
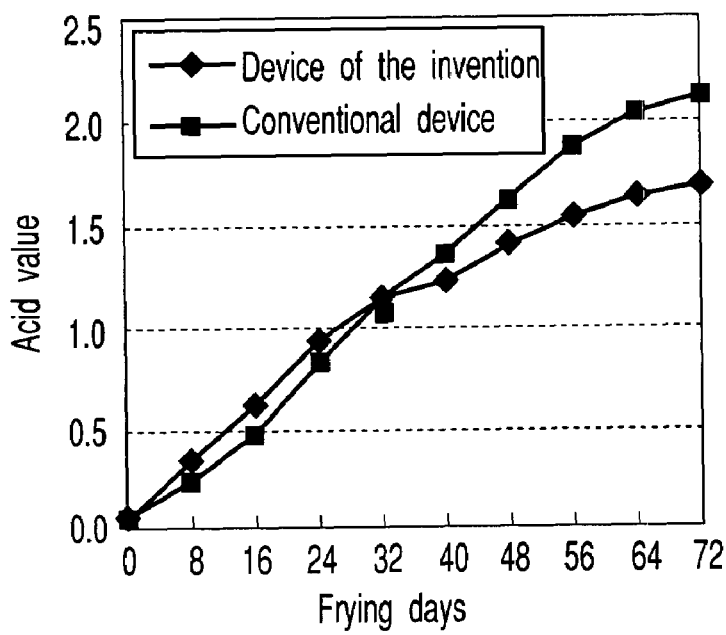
FIG. 17 is a graph showing the relationship between the number of frying days and the acid value of the frying oil for Example 2.
Figure 18:
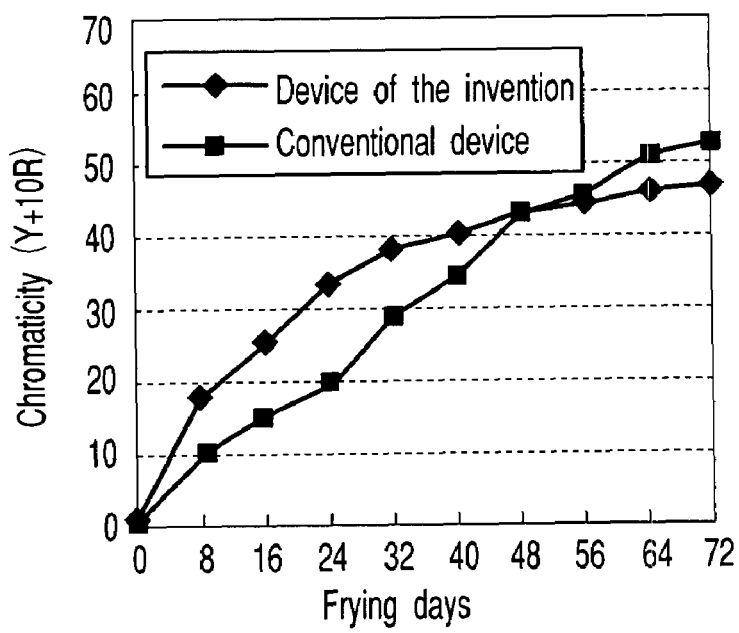
FIG. 18 is a graph showing the relationship between the number of frying days and the chromaticity of the frying oil for Example 2.
Figure 19:
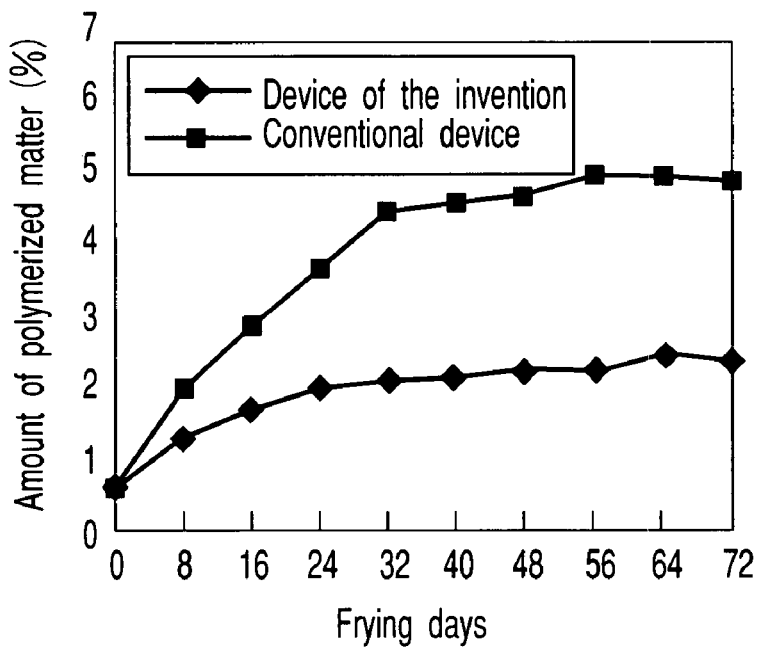
FIG. 19 is a graph showing the relationship between the number of frying days and the polymerized matters formed in the frying oil for Example 2.
Figure 20:
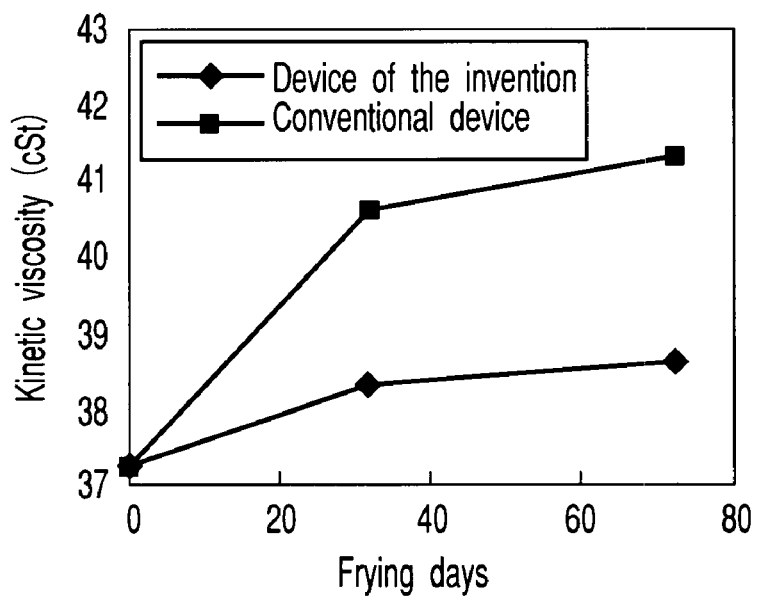
FIG. 20 is a graph showing the relationship between the number of frying days and the kinetic viscosity of the frying oil for Example 2.

Incidentally, it is desirable for the croquettes and cutlets to be held upright during the fry cooking operation, as described previously. However, when it comes to the frying ingredients having an adhesive coating such as tempura, the frying ingredients are attached to each other during the fry cooking operation. In this case, it is desirable to use a carrier having a plurality of stacked racks on which tempura or the like is disposed. It is particularly desirable to perform the frying operation without superposing the frying ingredients one upon the other on each rack. FIG. 11 shows an ingredient carrier 70 equal in construction to the carrier 60 shown in FIG. 2, except that the carrier 70 includes a plurality of stacked racks 64 for disposing the frying ingredients thereon.

In the present invention, it is desirable to carry out the method of preparing a fry cooked product of the present invention by disposing the frying ingredients on any of the carriers described above and by using any of the fry cooking devices described above.

It is possible to shorten the fry cooking time and to make the fry cooking time constant by controlling the materials and the size of the frying ingredients. This operation is adapted for the case where the fry cooking is performed after receipt of an order.

In the present invention, it is possible to suppress the generation of the waste frying oil or to substantially prevent the waste frying oil from being generated depending on the operating conditions. Also, in the present invention, it is possible to suppress the energy consumption (e.g., the power consumption), to suppress the generation of the frying refuse that must be discarded, and to suppress the generation of the odor. Such being the situation, the fry cooking device of the present invention is excellent in the effect of conserving the environment and, thus, can be said to be a fry cooking device of the type conforming with the environmental problem.

A large amount of the oil smoke and odor was generated during the fry cooking operation in the past so as to make it difficult to deodorize the exhaust gas. Also, in the prior art, it was difficult to achieve the deoderization by the local exhaust system because the frying oil surface was large. In the present invention, however, the odor generation is low during the fry cooking operation. In addition, the frying oil surface is small, and the oil smoke and the water vapor are generated in a highly concentrated fashion. Such being the situation, it is possible to discharge the odor effectively by the local discharge system. FIG. 12 is an oblique view schematically exemplifying the construction of a fry cooking device 1200 of the present invention, which is equipped with a local exhaust device. As shown in the drawing, the fry cooking device 1200 comprises a fry cooker 10 having a control box of the present invention housed therein. The control box has already been described. Also, in this case, the fry cooker 10 need not be equipped with an frying oil supply mechanism. The fry cooking device 1200 comprises a support box 1210. A freezing chamber 1211 for storing the frying ingredients in a frozen manner, which can be withdrawn, is formed in a part of the support box 1210. Also, a blower (not shown) for the exhaust operation is housed together with an exhaust line inside the support box 1210. The waste gas discharged through the exhaust line is discharged to the outside through an exhaust port 1215. It is possible to mount a deodorizing filter to the exhaust line inside the support box. Incidentally, it is possible to mount on the support box 1210 a tray 1240 for housing the frying ingredients 90 taken out of the freezing chamber 1211.

An exhaust duct 1212 connected to the exhaust line within the support box 1210 extends upward from the support box 1210 in a direction perpendicular to the upper surface of the support box 1210. A flexible pipe 1213 is connected to the upper end of the exhaust duct 1212, and an exhaust hood 1214 is mounted to the tip of the flexible pipe 1213. The flexible pipe 1213 itself, which is freely deformed upon application of an external force (for example, deformed by the application of the manual force) and the deformation is retained after removal of the external force, is known to the art. The exhaust hood 1214 is for a so-called "local exhaust" and has a size and a shape adapted for covering at least a part of the upper open surface of the frying oil layer included in the fry cooker 10. The size of the open surface at the tip of the exhaust hood, which covers the open upper surface of the frying oil vessel, can be controlled by, for example, the exhaust suction force from the exhaust hood. Also, it is possible for an oil mist filter to be arranged within the exhaust hood 1214.

It is possible to arrange a permeable member 1230 for preventing the oil repelling, to which the oil droplets can be attached and through which the air can be passed freely and which is formed of, for example, an unwoven fabric, above he ingredient carrier 1220 that is moved up and down by the lift mechanism 30 and below the exhaust hood 1214. The permeable member 1230 for preventing the oil repelling can be interlocked with the lift mechanism 30.

The present invention provides a fry cooking system, comprising a fry cooker, a first carrier housing the frying ingredients before the fry cooking, a second carrier having the frying ingredients disposed thereon for subjecting the frying ingredients to the fry cooking operation within the frying oil, a third carrier having a fry cooked product after the fry cooking disposed thereon for removing the excess frying oil from the fry cooked product, and an optional fourth carrier having the fry cooked product disposed thereon for the display purpose. In this case, the fry cooker consists of the fry cooking device of the present invention, and a single kind of the carrier can be used for each of the first to fourth carriers. For the display of the fry cooked product, it is possible for the fourth carrier housing the fry cooked product to be arranged within a display case equipped with an warmer. In the present invention, it is possible to use a single carrier for disposing thereon the frying ingredients before the fry cooking, for disposing thereon the frying ingredients during the fry cooking operation so as to subject the frying ingredients to the fry cooking, for disposing thereon the fry cooked product after the fry cooking so as to remove the excess frying oil from the fry cooked product, and for disposing thereon the fry cooked product for the display purpose. It should be noted that the carrier used for disposing the fry cooked product can be used again for disposing thereon the frying ingredients before the fry cooking, for disposing thereon the frying ingredients during the fry cooking operation so as to subject the frying ingredients to the fry cooking, for disposing thereon the fry cooked product after the fry cooking so as to remove the excess frying oil from the fry cooked product, and for disposing thereon the fry cooked product for the display purpose. In practice, a plurality of carriers are used so as to carry out consecutively the series of operations ranging between the disposition of the frying ingredients before the fry cooking operation and the disposition of the fry cooked product for the display purpose so as to achieve an excellent working efficiency throughout the entire frying operation. The present invention achieves an excellent working efficiency in respect of each of the frying operations. For example, by disposing in advance the frying ingredients before the fry cooking operation on a carrier, it is possible to eliminate the restriction in respect of the time and operation required for putting the frying ingredients in the frying oil layer. It is also possible to take out collectively the ingredients after the fry cooking so as to obtain an advantage in respect of the time and the operation. In addition, the excess frying oil can be removed from the fry cooked product without requiring a particular operation for removing the excess frying oil from the fry cooked product. Also, it is unnecessary to arrange the ingredients on another site for removing the excess frying oil. In addition, in respect of the display of the fry cooked product for the selling purpose, it is unnecessary to display the fry cooked product every time the fry cooking operation of the frying ingredients is finished. The present invention is excellent not only in the operation but also in the safety. For example, it is possible to prevent the frying oil from being repelled when the frying ingredients are put into the frying oil layer. Also, it is possible to prevent, for example, the scalding that was likely to be brought about when the ingredients were taken out after completion of the fry cooking operation. Also, an accident is unlikely to take place because a special operation is not required for carrying the fry cooked product into, for example, a display case. Further, when it comes to the quality of the fry cooked product, the present invention produces the effect that the frying ingredients can be fried uniformly. In addition, since the fry cooked product is fixed to the same carrier, it is substantially impossible for the fry coating to be peeled off the fry cooked product so as to improve the outer appearance and the quality of the fry cooked product. In addition, according to the system of the present invention, an operation that is not required need not be performed, with the result that the operation is simple and efficient. Furthermore, the safety can be improved.

The present invention will now be described more in detail with reference to Examples of the present invention. Needless to say, the technical scope of the present invention is not limited at all by the following Examples.

EXAMPLE 1

Under the test conditions given below, the frying operation in the case of using a middle fry cooking device of the present invention was compared with the frying operation in the case of using a conventional fry cooking device in respect of the state of deterioration (i.e., acid value, chromaticity, polymerized matter amount and kinetic viscosity) of the frying oil after the fry cooking operation:

Test Conditions:
Fry Cooking Apparatus:
Present Invention
Frying oil vessel sized at 9 cm (width)×16 cm (length)×17 cm (height) and having 144 cm² of the open area
The frying oil was poured into the frying oil vessel in an amount corresponding to about 70% of the volume of the frying oil vessel.
Conventional fry cooking device (Eishin Denki EF-3L type)
Frying oil: rape seed oil+palm olein (7:3)
Amount of Frying Oil Used:
1.50 kg (present invention); 3.0 kg (conventional fry cooking device);
Set Temperature:
The temperature of the frying oil when the frying ingredients were not put therein was set at 180° C.
Heating time: 8 hours/day;
Frying days: 7 days;
Frying Ingredients:
frozen croquettes, frozen chicken without coating, and fried potatoes;
Frying Amount:
4 frozen croquettes, 8 frozen chicken without coating and 200 g of fried potatoes per hour.
Replenishment of Frying Oil:
A fresh frying oil was added three times in a day for making up for the frying oil absorbed by the frying ingredients during the fry cooking operation.

FIGS. 13 to 16 are graphs showing the experimental data.

As apparent from the experimental data given in FIGS. 13 to 16, the present invention permits markedly suppressing the deterioration of the frying oil, compared with the prior art.

The power consumption for the frying operation for 8 hours in a day under the conditions given above was measured, with the result that the power consumption for the fry cooking device of the present invention was found to be 66 kWh in contrast to 131 kWh for the conventional fry cooking device. The fry cooking device of the present invention has a small surface area of the frying oil and, thus, the amount of heat released from the surface of the frying oil is small. As a result, the amount of heat generated from the heater for elevating and maintaining the temperature of the frying oil during the fry cooking operation can be decreased so as to decrease the power consumption.

EXAMPLE 2

The frying operation in the case of using the fry cooking device of the present invention, which was used in Example 1, was compared with the frying operation in the case of using a conventional fry cooking device in respect of the state of deterioration (i.e., acid value, chromaticity, polymerized matter amount and kinetic viscosity) of the frying oil after the fry cooking operation. The test conditions were equal to those for Example 1 except the following items:

Test Conditions:
Frying days: 9 days;
Frying ingredients: frozen croquettes;
Frying Amount:
4 frozen croquettes in every frying operation;
The number of frying times:
twice/hour (=16 times/8 hours);

FIGS. 17 to 20 are graphs each showing the experimental data.

Tables 2 to 8 show the experimental data in respect of the outer appearance of the fry cooked product obtained, the peeling area of the bread powder layer forming the fry coating and the taste (by the organoleptic evaluation, the amount of the frying oil absorbed by the coating of the croquette, the amount of the frying oil consumed and the generation amount of the frying refuse. As apparent from the experimental data given in Tables 2 to 8, the present invention makes it possible to improve the outer appearance and the taste of the fry cooked product and permits suppressing the peeling of the bread powder.

TABLE 2

Outer appearance of croquette

|  | Device of the present invention | Conventional Device |
|---|---|---|
| Attachment of frying refuse | Substantially none | Much |
| Nonuniformity of fried color for every frying | Substantially none | Recognized |
| Difference in fried color between front and back surfaces | None | Somewhat recognized (back surface was thin) |
| Oozing of frying oil into paper sheet disposed below fry cooked product | Smaller than that in conventional device | Larger than that in device of the present invention |

TABLE 3

Peeling area of bread powder layer

| Croquette No. | Device of the present invention | Conventional Device |
|---|---|---|
| 1 | 0 | 1.8 |
| 2 | 0 | 2.7 |
| 3 | 0.2 | 1.5 |
| Average | 0.1 | 2.0 |

TABLE 4

Result of organoleptic examination of taste; 15 panels

| Questions | Device of the invention | Conventional Device | Judgment |
|---|---|---|---|
| Oily outer appearance | 5 | 10 | |
| Oily odor; unpleasant odor | 2 | 13 | Oily odor is significant for conventional device |

TABLE 4-continued

Result of organoleptic examination of taste; 15 panels

| Questions | Device of the invention | Conventional Device | Judgment |
|---|---|---|---|
| Fragrance | 11 | 4 | (significance level of 1%) Significantly fragrant for the device of the invention (significance level of 5%) |
| Body and taste | 9 | 6 | |
| Plain feel | 10 | 5 | |
| Crisp feel | 10 | 5 | |
| Overall preference | 11 | 4 | Significantly preferred for the device of the invention (significance level of 5%) |

Note:
The numeral in the Table denotes the number of panels answering "stronger" in reply to the question.

TABLE 5

Amount (g) of frying oil absorbed by fry coating of croquette

| Croquette No. | The invention | Conventional Device (5 L type) |
|---|---|---|
| 1 | 10.1 | 13.8 |
| 2 | 9.2 | 12.8 |
| 3 | 9.3 | 14.2 |
| Average | 9.5 | 13.6 |
| Index | 0.70 | — |

As apparent from Table 5, according to the method of the present invention, it is possible to decrease the amount of the frying oil absorbed by the frying ingredients after the fry cooking.

According to the method of preparing a fry cooked product of the present invention, it is particularly important to note that the ingredients after the fry cooking are taken out of the frying oil layer with the ingredients held upright. It has been found that the particular manner of taking out the fry cooked product makes it possible to decrease the amount of the frying oil absorbed by the ingredients.

Further, the amount of the frying oil contained in the fry coating on the flat surface of the croquette was measured, with the results as shown in Tables 6, 7 and 8. In the conventional fry cooking method, the fry cooked product is taken out with the flat surface of the ingredients turned upward or downward.

TABLE 6

Amount of oil contained in the fry coating on the surface of croquette

| | The invention | Conventional |
|---|---|---|
| Flat upper surface | 23.2% | 31.9% |
| Flat lower surface | 22.0% | 37.2% |

As apparent from the experimental data given in Table 6, it has been found that the amount of the frying oil absorbed by the fry coating of the croquette is small in the case of frying the croquette by the method of the present invention. Also, the experimental data for the conventional method clearly indicate that the amount of the frying oil staying on the lower surface of the ingredients gives a greater influence to the amount of the frying oil absorbed by the ingredients than the amount of the frying oil staying on the upper surface of the ingredients.

TABLE 7

Amount of frying oil consumption

| | Unit | Device of the invention | Conventional device |
|---|---|---|---|
| Amount of oil supplied (a) | g | 1,500 | 3,000 |
| Amount of replenished oil (b) | g | 6,430 | 8,360 |
| Decreased amount of frying oil* (e = a + b − c − d) [Per croquette] | g | 6,155 [10.7] | 8,135 [14.1] |
| Fresh frying oil addition rate** (Fat/oil turnover rate) | %/hour | 6.0 | 3.9 |
| Amount of frying oil used (a + e) | g | 7,655 | 11,135 |

Note:
*Amount of frying oil absorbed by croquette + loss by adsorption on discarded frying refuse + loss by scattering to outside the fry cooking device;
**Amount of absorbed frying oil + sampling amount)/amount of frying oil used × 72 hours) × 100

TABLE 8

Generation amount of frying refuse (mass after defatting)

| | Device of the invention | Conventional Device | Device of the invention/Conventional device |
|---|---|---|---|
| After completion of first day | 11.1 g | 16.9 g | 0.66 |
| After completion of second day | 13.0 g | 18.9 g | 0.69 |

Note:
The entire amount of the frying refuse was recovered, and measured was the mass after the degreasing with a petroleum ether.

Incidentally, concerning the stains of the fry cooking device, strongly stuck stains consisting of the fat/oil polymerized matters and the frying refuse were prominently observed in the inner surface of the frying oil vessel corresponding to the frying oil surface in the case of the conventional fry cooking device. However, such stains were scarcely observed in the fry cooking device of the present invention.

EXAMPLE 3

The case of using the fry cooking device of the present invention equal to that used in Example 1 was compared with the case of using the conventional fry cooking device by 10 panels in respect of the intensity of the odor generated when the fry cooking was performed under the conditions equal to those for Example 1. The intensity of the odor was evaluated by the method described below.

<Evaluating Method of Odor>

Every panel entered the experimental room in which the fry cooking was being performed so as to evaluate the intensity of the frying odor filling the experimental room in stages, i.e., point 2 (odor was felt strongly), point 1 (odor was slightly felt), point 0 (odor was scarcely felt). Table 9 shows the result.

TABLE 9

Intensity of Odor within Experimental Room

| Result of evaluation | Device of the invention | Conventional device |
|---|---|---|
| Strongly felt | 0 panel | 3 panels |
| Slightly felt | 3 panels | 7 panels |
| Scarcely felt | 7 panels | 0 panel |
| Evaluation point | Point 3 | Point 13 |

As apparent from the experimental data given in Table 9, the intensity of the frying odor generated in the case of using the fry cooking device of the present invention was prominently lower than that in the case of using the conventional fry cooking device, supporting that the fry cooking device of the present invention makes it possible to maintain satisfactory the environment of the cooking room and the building in which the frying operation is performed.

EXAMPLE 4

Changes with time in the degree of deterioration (polymerized matter amount) were measured for every turnover rate (1% to 6%) by using the fry cooking device of the present invention under the conditions equal to those for Example 2. FIG. 21 shows the results. As apparent from the experimental data given in FIG. 21, the polymerized matter amount in the fat/oil can be maintained at a low level not higher than 5%, which does not bring about any problem, if the turnover rate of the fat/oil is set at 2% or higher.

EXAMPLES 5 TO 8

Table 10 shows the turnover rate and the turnover rate value in the case of carrying out the frying method of the present invention under the conditions equal to those for Example 2 in comparison with those in the case of carrying out the conventional frying method.

TABLE 10

|  | Conventional | The invention ||||
|---|---|---|---|---|---|
|  |  | Example 5 | Example 6 | Example 7 | Example 8 |
| Loading rate (%) | 66 | 12 | 15 | 20 | 25 |
| HA/√SA | 0.3 | 0.6 | 0.6 | 0.8 | 1.0 |
| Turnover rate (%/hour) | 1.3 | 2.7 | 3.5 | 5.0 | 6.7 |
| Turnover rate value | 1.0 | 2.1 | 2.8 | 3.9 | 5.2 |

EXAMPLE 9

The use of the fry cooking device of the present invention equal to that used in Example 1 was compared with the use of the conventional fry cooking device in respect of the relationship between the temperature of the frying oil when heated and the heating time. FIG. 22 shows the result. As apparent from the experimental data given in FIG. 22, the temperature elevation rate in the rising stage is very high in the case of using the fry cooking device of the present invention because the frying oil vessel was small (frying oil amount was small) in the fry cooking device of the present invention.

EXAMPLE 10

Figure 23:
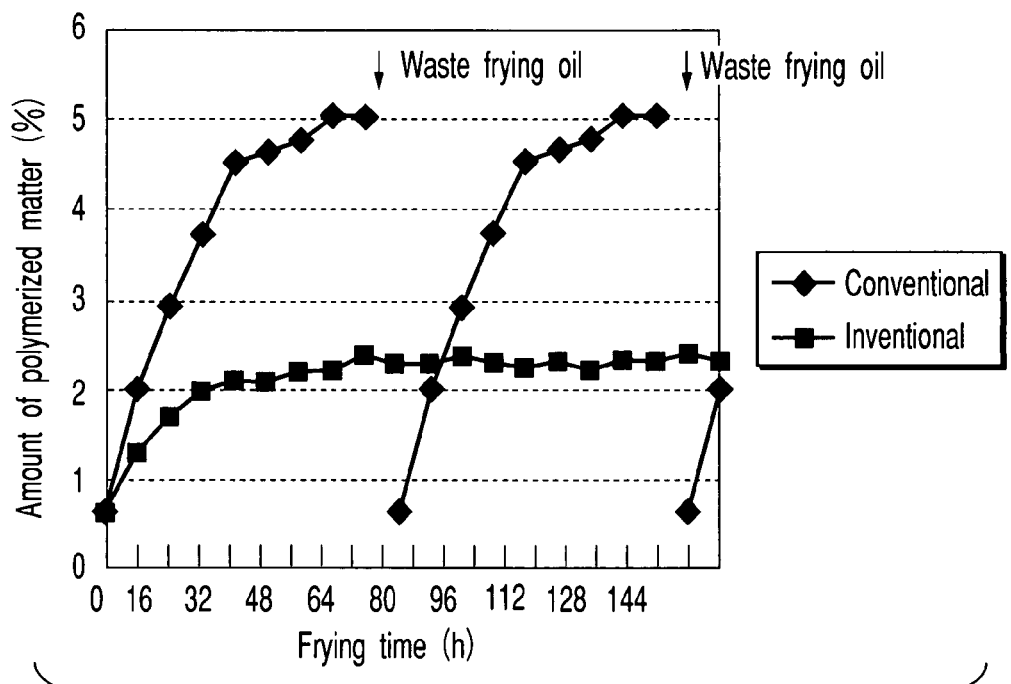
FIG. 23 is a graph showing the change with time in the degree of deterioration of the frying oil (polymerized matter amount), covering the case where the frying operation was performed for a long time in Example 9.

Measured were the changes with time in the degree of deterioration (polymerized matter amount) of the fat/oil in the case of performing the frying operation for a long time under the conditions equal to those for Example 2. FIG. 23 shows the results covering the cases of using the fry cooking device of the present invention and using the conventional fry cooking device. As apparent from the experimental data given in FIG. 23, the upper limit (5%) of the polymerized matter amount is exceeded a prescribed time later in the case of using the conventional fry cooking device, with the result that it is necessary to discard the entire fat/oil in the next stage. In the case of using the fry cooking device of the present invention, however, the polymerized matter amount is maintained at a low level over a long period of time, making it unnecessary to discard the deteriorated fat/oil frequently as in the use of the conventional fry cooking device.

EXAMPLE 11

Figure 24:
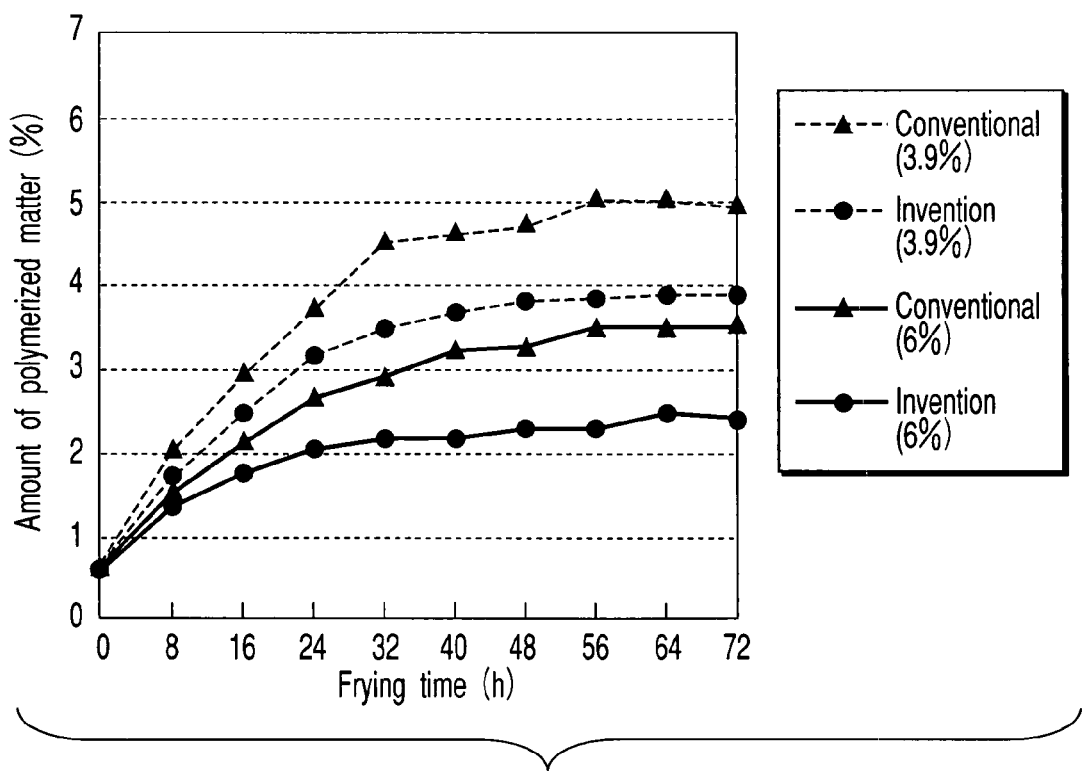
FIG. 24 is a graph showing the change with time in the degree of deterioration of the frying oil (polymerized matter amount), covering the cases where the turnover rate was set at 3.9% and 6% in Example 10.

Changes with time in the degree of deterioration (polymerized matter amount) of the frying oil were measured under the conditions equal to those for Example 2, covering the cases where the turnover rate was set at 3.9% and 6%. The experiment was conducted for the cases of using the fry cooking device of the present invention and the conventional fry cooking device. FIG. 24 shows the result. As apparent from the experimental data given in FIG. 24, the frying oil is unlikely to be deteriorated in the case of using the fry cooking device of the present invention because the surface area of the frying oil layer is small in the fry cooking device of the present invention, compared with that of the conventional fry cooking device and, thus, contact area of the frying oil surface with the air is smaller in the case of using the fry cooking device of the present invention. Such being the situation, the generation of the deteriorated materials of the fat/oil was much suppressed in the case of using the fry cooking device of the present invention, compared with the use of the conventional fry cooking device.

EXAMPLE 12

The case of using the fry cooking device of the present invention was compared with the case of using the conventional fry cooking device by means of the liquid chromatography in respect of the polymerized matter amount in the frying oil and the polymerized matter composition after the fry cooking under the test conditions given below.

Test Conditions:

Fry Cooking Device:

Present Invention

Frying oil vessel sized at 10 cm (width)×18 cm (length)×17 cm (height) and having 180 cm² of the open area;

The frying oil was poured into the frying oil vessel in an amount corresponding to about 70% of the volume of the frying oil vessel.

Conventional fry cooking device (Eishin Denki EF-5L type) (Ingredient loading rate=6.25%, $HA/SA^{1/2}$=about 0.3);

Frying oil: rape seed oil+palm olein (7:3)

Amount of Frying Oil Used:

1.80 kg (present invention); 4.0 kg (conventional fry cooking device);

Set Temperature:

The temperature of the frying oil when the frying ingredients were not put therein was set at 180° C.

Heating time: 8 hours/day;

Frying days: 11 days;

Frying Ingredients:

frozen croquettes, frozen chicken without coating, and fried potatoes;

Frying Amount:

21 frozen croquettes, 56 frozen chicken without coating and 1000 g of fried potatoes per day.

Replenishment of Frying Oil:

A fresh frying oil was added three times in a day for making up for the frying oil absorbed by the frying ingredients during the fry cooking operation.

TABLE 11

Result of Measurement of Polymerized Matter Amount

| | Polymerized matter (%) | | | |
|---|---|---|---|---|
| | Polymer | Trimer | Dimer | Total |
| The invention | 0.33 | 2.16 | 1.60 | 4.09 |
| Conventional (5 L) | 0.82 | 4.36 | 3.07 | 8.25 |
| Polymerized matter index | 0.40 | 0.50 | 0.52 | 0.50 |

Note:
Polymer denotes highly polymerized matters of tetramer or higher.

As apparent from the experimental data given in Table 11, the amount of the polymerized matters including the trimer and dimer is suppressed to a low level. The high polymer amount is also suppressed to a low level. Also, the entire amount of the polymerized matters is suppressed to a low level.

EXAMPLE 13

The fry cooking was performed under the conditions equal to those for Example 1, and the materials scattered from the frying oil surface at 180° C. were caught in respect of the frying oil after completion of the seventh day. The components of the scattered materials were analyzed by chromatography. Table 12 shows the result. The amount of the odor component for the present invention is shown in Table 12 by the index with the amount of the odor component for the conventional case being set at 1.

TABLE 12

Result of Odor Measurement

| | The invention | Conventional |
|---|---|---|
| Acrolein | 0.87 | 1 |
| 2,4-heptadienal | 0.85 | 1 |

EXAMPLE 14

Frozen croquettes, frozen chicken without coating, and fried potatoes were subjected to the fry cooking under the frying conditions given in Table 13 by using the fry cooking device of the present invention equal to that used in Example 12 and the conventional fry cooking device so as to measure the power consumption required for fry cooking. Incidentally, the temperature of the frying oil was set such that the temperature when the frying ingredients were not put in the frying oil was 180° C. Table 14 shows the result.

TABLE 13

Frying Conditions

Number of frying operations

| | Potatoes; 2 meals | Croquettes; 3 meals | Fried chicken without coating; 2 meals | Total number of frying times | Operation time (hours) Total |
|---|---|---|---|---|---|
| Condition 1 | 5 | 5 | 5 | 15 | 20 |
| Condition 2 | 5 | 4 | 4 | 13 | 8 |
| Condition 3 | 4 | 3 | 3 | 10 | 3 |

TABLE 14

Power Consumption

Power consumption (kWh)

| | Device of the invention | Conventional device | Reduction index of energy used |
|---|---|---|---|
| Condition 1 | 4 | 8 | 0.45 |
| Condition 2 | 2 | 4 | 0.50 |
| Condition 3 | 2 | 3 | 0.54 |

EXAMPLE 15

The temperature at the center of each of five croquettes, which were simultaneously subjected to the frying cooking in Example 2, was measured 7 minutes later so as to confirm the uniformity of the degree of the fry cooking. Table 15 shows the result of the measurement.

TABLE 15

Central temperature of croquette after frying

| Croquette No. | The invention | Conventional |
|---|---|---|
| 1 | 80° C. | 74° C. |
| 2 | 76° C. | 68° C. |
| 3 | 79° C. | 82° C. |
| 4 | 76° C. | 64° C. |
| 5 | 80° C. | 73° C. |
| Average | 78.2° C. | 72.2° C. |

According to the method of preparing a fry cooked product of the present invention, it has been found that the nonuniformity in the degree of cooking is small among the frying ingredients in the case of simultaneously cooking a plurality of frying ingredients. The experimental data clearly support that, according to the method of preparing a fry cooked product of the present invention, the fry cooking can be performed uniformly.

EXAMPLE 16

Frozen croquettes were subjected to the fry cooking by using the fry cooking device used in Example 12 and the conventional fry cooking device so as to measure the central temperature of the croquettes after the frying. In this test, the frying time was set to fall within a range of 5 minutes to 6.5 minutes. After the frying operation, the fried croquettes were left to stand under room temperature for 7 minutes and, then, the central temperature of the fried croquette was measured. Ten croquettes were used for each case in this experiment so as to obtain the average of the measured values and the standard deviation. Table 16 shows the result.

TABLE 16

Central Temperature of Croquette
(7 minutes after frying)

| Frying time (minutes) | The invention | Conventional |
|---|---|---|
| 5.0 | 72 (±3.2) | 67 (±5.1) |
| 5.5 | 78 (±2.5) | 72 (±5.9) |
| 6.0 | 85 (±2.9) | 78 (±7.3) |
| 6.5 | 88 (±4.0) | 83 (±6.2) |
| 7.0 | 92 (±3.4) | 89 (±5.4) |

Also, Table 17 shows the frying time required for reaching the indicated temperature about the central temperature of 80° C. that provides a criterion indicating the completion of the fry cooking.

TABLE 17

Fry cooking time required for reaching indicated temperature

| | The invention | Conventional |
|---|---|---|
| 70° C. | 4 minutes and 54 seconds | 5 minutes and 18 seconds |
| 75° C. | 5 minutes and 15 seconds | 5 minutes and 44 seconds |
| 80° C. | 5 minutes and 37 seconds | 6 minutes and 12 seconds |
| 85° C. | 6 minutes and 00 seconds | 6 minutes and 45 seconds |

EXAMPLE 17

Under the test conditions given below, the case of using the fry cooking device of the present invention was compared with the case of using the conventional fry cooking device in respect of the state of the deterioration (acid value, polymerized matter amount) of the frying oil after the fry cooking.

Test Conditions:

Fry Cooking Apparatus:

Present Invention

Frying oil vessel sized at 19 cm (width)×24 cm (length)×36 cm (height) and having 456 $cm^2$ of the open area;

Conventional fry cooking device (FA-18 type manufactured by Mach Machine K.K.)

Frying oil: rape seed oil+palm olein (7:3)

Amount of Frying Oil Used:

8.30 kg (present invention); 16.50 kg (conventional fry cooking device);

Set temperature: 175° C.

Heating time: 10 hours/day;

Frying days: 7 days;

Frying ingredients: frozen croquettes;

Frying Amount:

The frying operation was performed 20 times in a day. In each frying operation, 20 frozen croquettes were subjected to the fry cooking. In fry cooking operation, used was an ingredient carrier having two stages of supporting racks. The frozen croquettes were equidistantly arranged on each of the supporting racks during the fry cooking operation.

FIGS. 25 and 26 show the experimental data.

As apparent from the experimental data given in FIGS. 25 and 26, the present invention makes it possible to markedly suppress the deterioration of the frying oil, compared with the conventional method.

Also examined were the outer appearance and the taste (by organoleptic inspection) of the fry cooked product and the amount of the frying oil absorbed by the fry coating. Tables 18 and 19 show the results. As apparent from Tables 18 and 19, the present invention permits improving the outer appearance and taste of the fry cooked product and also permits decreasing the excess frying oil contained in the fry coating.

TABLE 18

Result of Function Inspection of Taste (14 panels)

| Questions | Device of the invention | Conventional device | Judgment |
|---|---|---|---|
| Oily outer appearance | 3 | 11 | Oily outer appearance is significantly produced in conventional device (significance level of 5%) |
| Oily odor; unpleasant odor | 4 | 10 | |
| Fragrance | 8 | 6 | Significantly fragrant in fry cooking device of the invention (significance level of 5%) |
| Incompatible taste | 3 | 11 | Fry cooked product prepared by conventional device presents a significantly incompatible taste (significance level of 5%) |

TABLE 18-continued

Result of Function Inspection of Taste (14 panels)

| Questions | Device of the invention | Conventional device | Judgment |
|---|---|---|---|
| Plain feel | 12 | 2 | Fry cooked product prepared by the device of the invention presents significantly plain feel (significance level of 1%) |
| Crisp feel | 10 | 4 | |
| Overall preference | 14 | 2 | Significantly preferred in the case of the device of the invention (significance level of 5%) |

Note:
The numeral in the Table denotes the number of panels answering "stronger" in reply to the question.

TABLE 19

Frying oil amount absorbed by coating of croquette

| Croquette No. | The invention | Conventional (18 L type) |
|---|---|---|
| Average of 3 croquettes | 11.6 | 13.7 |
| Index | 0.85 | — |

It should be noted in particular that, according to the method of the present invention, the frying ingredients are immersed in the frying oil for heating the frying ingredients in all directions, in contract to the conventional method in which the frying ingredients are allowed to float on the surface of the frying oil so as to cook only one surface of the frying ingredients and the heat is dissipated because the upper surface of the frying ingredients is in contact with the air. It follows that the method of the present invention permits performing the fry cooking in a short time with a high heat efficiency.

As described above, according to the present invention, it is possible to suppress the deterioration of the frying oil, and the turnover rate is high. Because of these two features, it is possible to suppress the increase in the amount of the deteriorated materials within the frying oil layer so as to maintain the amount of the deteriorated material at a prescribed level or lower, thereby making it possible to continue a suitable frying operation for a long time without discarding and renewing the fat/oil within the frying oil layer. It should be noted that it was customary in the past to use a fry cooking device having a large frying oil layer with increase in the amount of the frying ingredients. In other words, it was the common sense in the past to perform the fry cooking by using a frying oil layer having a large amount of the frying oil such that the size and the amount of the frying oil contained in the frying oil layer used in the frying operation were proportional to the amount of the frying ingredients. However, according to the present invention, a small frying oil layer is used and the amount of the frying oil used is decreased with increase in the amount of the frying ingredients, though there are some limitations, in contrast to the prior art in which a large frying oil layer is used and the amount of the frying oil used is increased with increase in the amount of the frying ingredients. It has been found in the present invention that the deterioration of the frying oil can be deteriorated and the quality and the taste of the fry cooked product can be improved in the case of using a small frying oil layer and decreasing the amount of the frying oil used with increase in the amount of the frying ingredients. The particular technical idea of the present invention overturns the common sense relating to the fry cooking method. It follows that the method of preparing a fry cooked product and the fry cooking device of the present invention are highly epoch-making.

What is claimed is:

1. A fry cooking device, comprising one or more frying oil vessels, the frying vessel having substantially parallelepiped shape with four sidewalls and a single bottom wall and satisfying a relationship of $HB/SB^{1/2}=1.1$ to $3.0$, where SB denotes an area of an open portion of the vessel, and HB denotes the depth of the vessel, wherein the frying vessel may form therein a frying oil layer meeting a relationship of $HA/SA^{1/2}=0.63$ to $3.5$ where SA denotes a surface area of the frying oil layer, and HA denotes the height from the bottom to the surface of the frying oil layer, and wherein a frying zone is provided within which frying ingredient is actually subjected to frying cooking, the frying zone covering at least 80% of the distance between the surface and the bottom of the frying oil layer.

2. The fry cooking device according to claim 1, further comprising a fluororesin coating layer in an upper portion on an inner surface of the frying oil vessel.

3. The fry cooking device according to claim 1, wherein a frying oil supply mechanism for supplying a frying oil is mounted on the frying oil vessel.

4. The fry cooking device according to claim 1, comprising a heater unit for heating the frying oil arranged on an outside of the frying oil vessel.

5. The fry cooking device according to claim 1, comprising a lid for opening and closing the frying oil vessel.

6. The fry cooking device according to claim 1, comprising a lift mechanism of a frying ingredient carrier introducing frying ingredients into the frying oil vessel, the lift mechanism being configured to put the frying ingredient carrier in and out of the frying oil vessel.

7. A fry cooking device set, comprising a fry cooking device according to claim 1, and an ingredient carrier capable of holding flat frying ingredients such that a flat surface of the frying ingredients makes an angle of 45° to 135° with a horizontal plane.

8. A fry cooking device set, comprising a fry cooking device according to claim 1, and an ingredient carrier provided with a plurality of racks on which frying ingredients are disposed.

* * * * *

UNITED STATES PATENT AND TRADEMARK OFFICE
CERTIFICATE OF CORRECTION

PATENT NO. : 7,624,676 B2  Page 1 of 1
APPLICATION NO. : 10/724084
DATED : December 1, 2009
INVENTOR(S) : Nishida et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 887 days.

Signed and Sealed this

Twenty-first Day of December, 2010

David J. Kappos
*Director of the United States Patent and Trademark Office*